United States Patent [19]

Fulghum et al.

[11] 4,254,304

[45] Mar. 3, 1981

[54] SIGNAL PROCESSOR FOR USE WITH A TELEPHONE SYSTEM AND A DIGITAL TRANSMISSION LINE

[75] Inventors: Donald P. Fulghum; Jerry W. Pate, both of Dallas, Tex.

[73] Assignee: E-Systems, Inc., Dallas, Tex.

[21] Appl. No.: 970,136

[22] Filed: Dec. 18, 1978

Related U.S. Application Data

[63] Continuation of Ser. No. 836,756, Sep. 26, 1977, abandoned.

[51] Int. Cl.³ .......................................... H04M 11/06
[52] U.S. Cl. ............................. 179/2 DP; 179/16 EC
[58] Field of Search ......... 179/16 EC, 18 EB, 15 BY, 179/84 VF, 15 BV, 2 DP

[56] References Cited

U.S. PATENT DOCUMENTS

| | | | |
|---|---|---|---|
| 3,409,742 | 11/1968 | Winter | 179/18 EB |
| 3,492,434 | 1/1970 | Michel | 179/15 BY |
| 3,536,840 | 10/1970 | Sullivan | 179/2 DP |
| 3,600,519 | 8/1971 | McNeilly et al. | 179/15 AL |
| 3,714,377 | 1/1973 | Moretti | 179/2 DP |
| 3,821,705 | 6/1974 | Chertok et al. | 179/2 DP |

FOREIGN PATENT DOCUMENTS

| | | | |
|---|---|---|---|
| 946530 | 4/1974 | Canada | 179/2 DP |
| 1235982 | 3/1967 | Fed. Rep. of Germany | 179/2 DP |

*Primary Examiner*—Bernard Konick
*Assistant Examiner*—Joseph A. Popek
*Attorney, Agent, or Firm*—Albert M. Crowder, Jr.; Robert V. Wilder

[57] ABSTRACT

A signal processor is provided for encoding telephone dialing signals received from a telephone system at a transmitting station and transmitted using a digital transmission system to a receiving station for decoding and application to a telephone system at the receiving station. The system includes circuitry connected to the telephone system at the transmitting station for detecting and receiving telephone dialing signals generated by the telephone system at the transmitting station. Circuitry is provided for storing the detected telephone dialing signals for a predetermined time period at the transmitting station. The system further includes circuitry interconnected between the circuitry for storing and the digital transmission system for selectively clocking this circuitry to generate digital representations of the telephone dialing signals for transmission to the receiving station. The system further includes circuitry connected to the digital transmission system at the receiving station for detecting and receiving the transmitted digital representations of the telephone dialing signals generated by the telephone system at the transmitting station and circuitry for decoding the digital representations of the telephone dialing signals at the receiving station for application to the telephone system at the receiving station.

4 Claims, 16 Drawing Figures

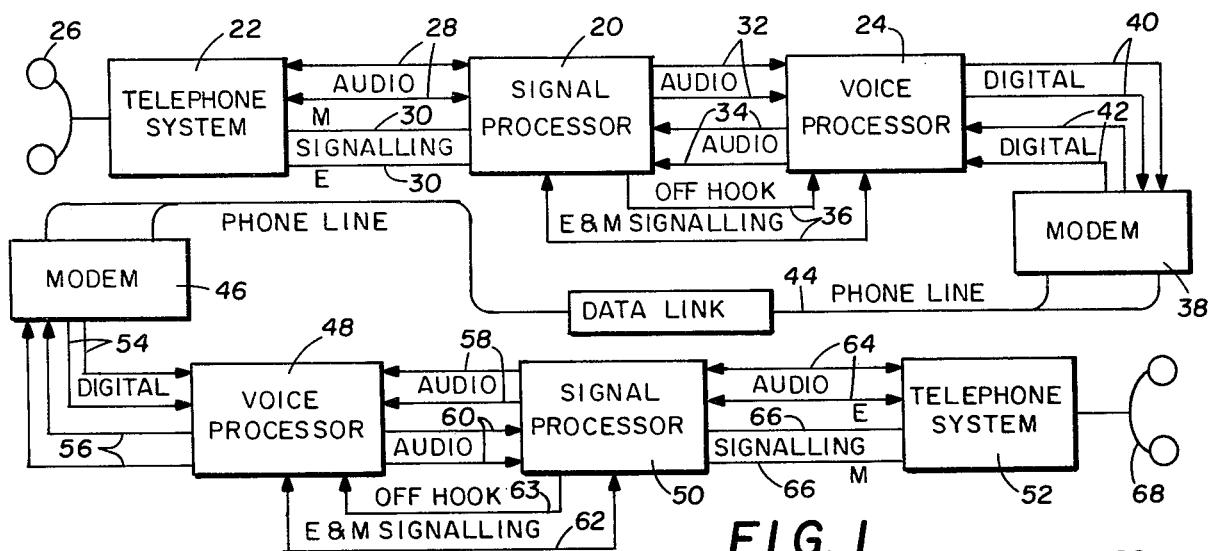
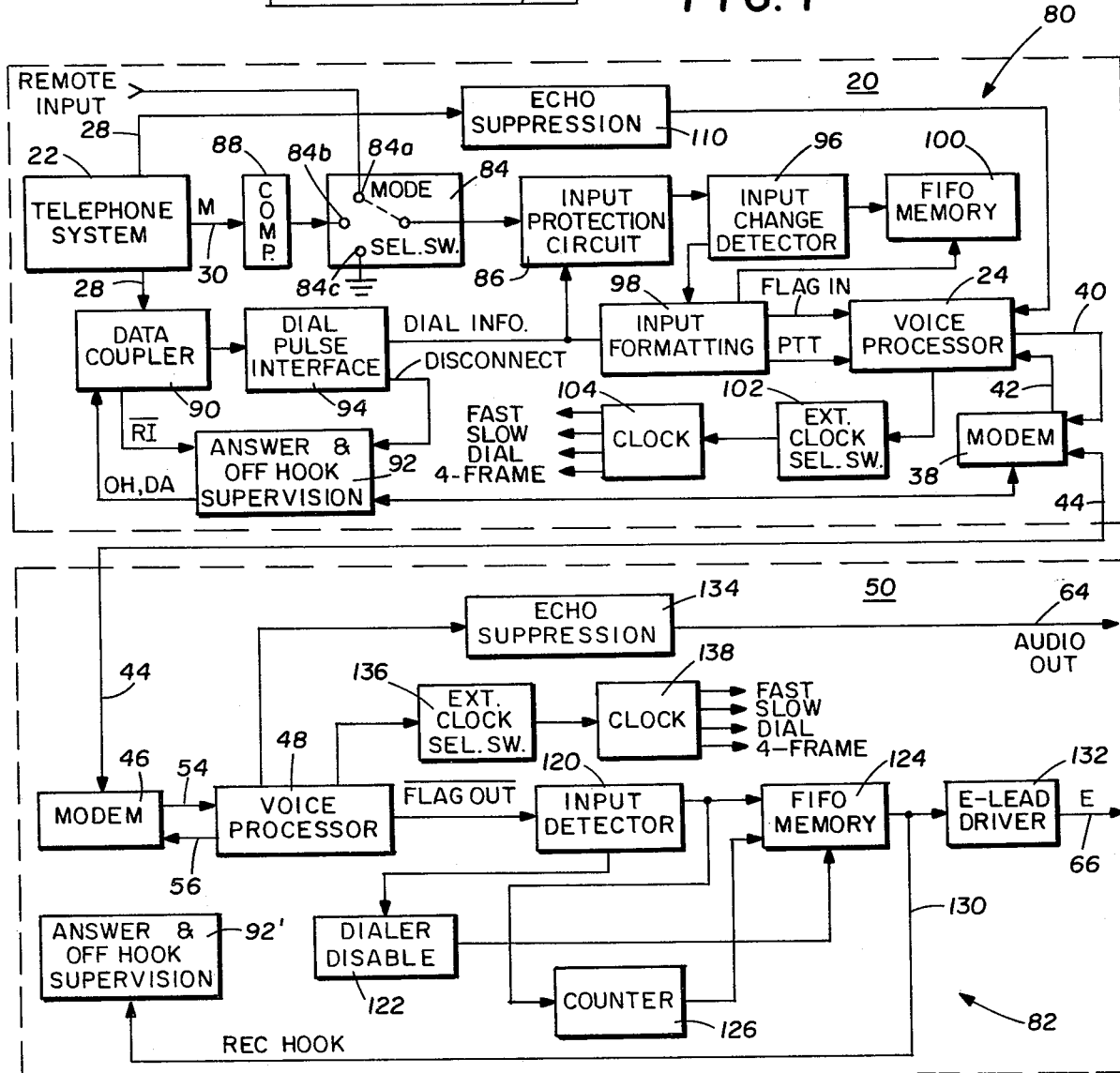
FIG. 1
FIG. 2

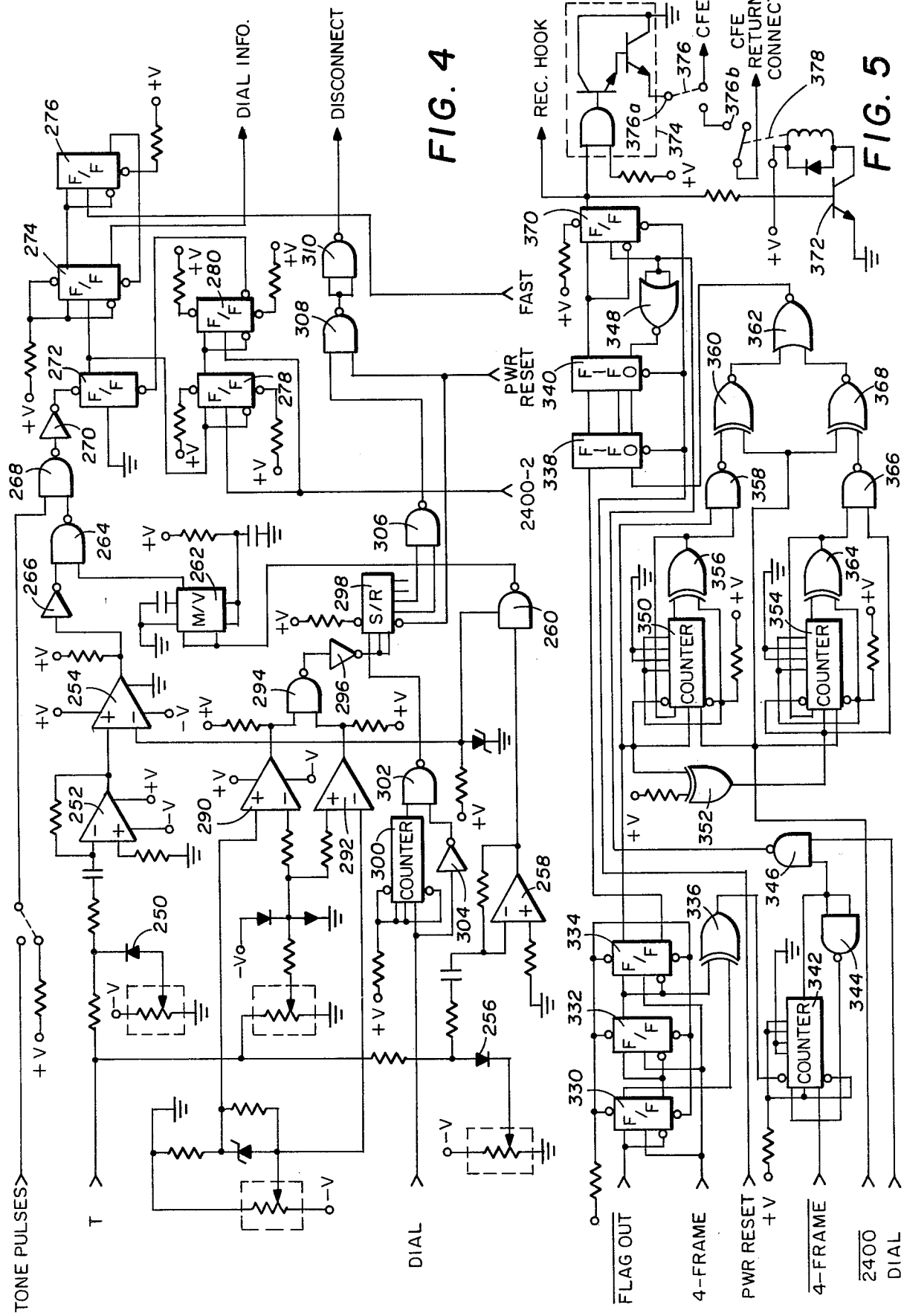

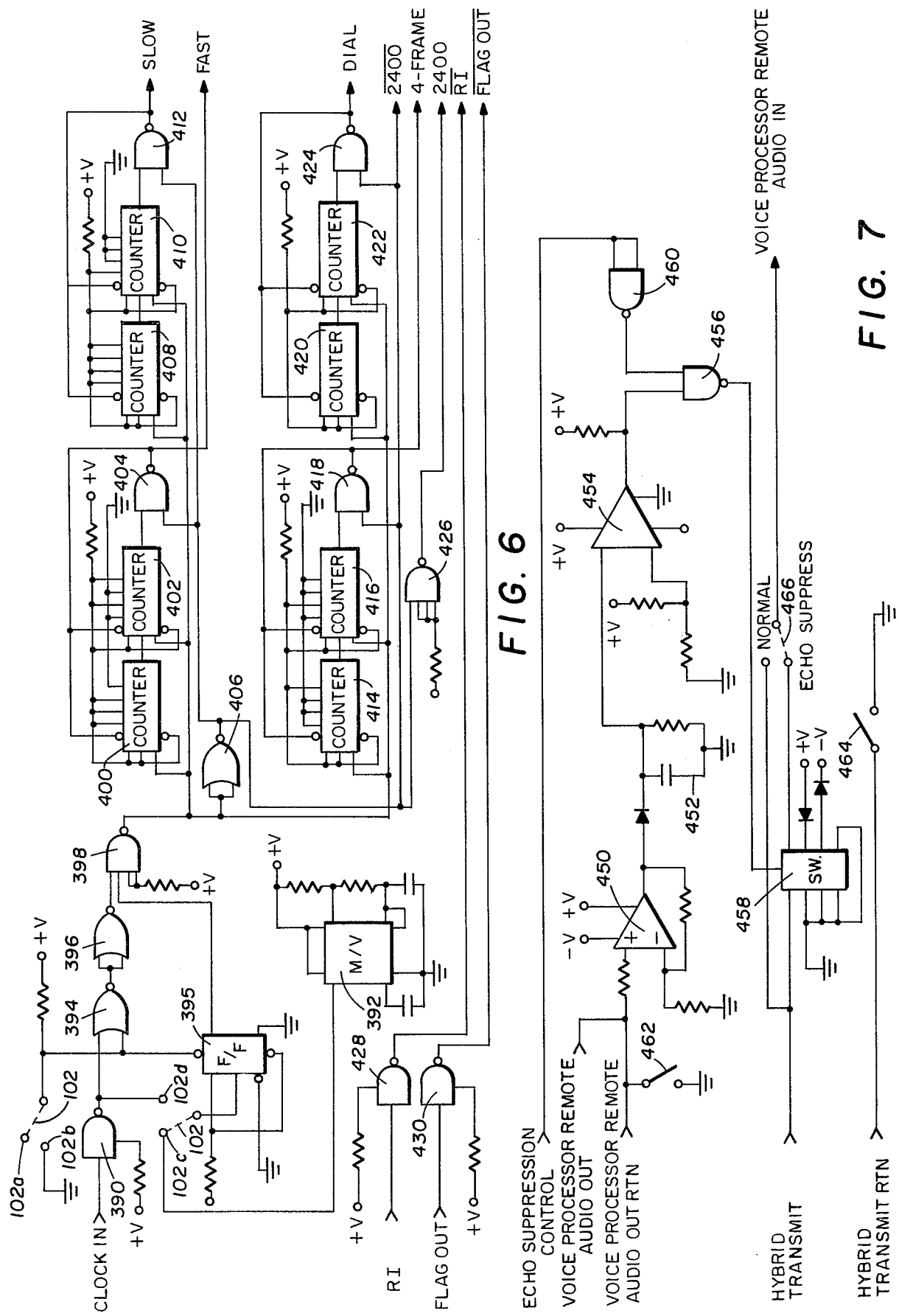

SIGNAL PROCESSOR FOR USE WITH A TELEPHONE SYSTEM AND A DIGITAL TRANSMISSION LINE

This is a continuation of application Ser. No. 836,756, filed Sept. 26, 1977, now abandoned.

FIELD OF THE INVENTION

This invention relates to communication systems and more particularly relates to a method and system for interfacing between a digital voice processor and a telephone system to digitize telephone dialing signals.

THE PRIOR ART

It is recognized in the communications art that the transmission of speech in the form of electrical signals can be accomplished by digital rather than analog techniques to achieve favorable results. Usable bandwidth is conserved under certain circumstances, less power is required and digital messages are harder to intercept. Digital voice signals can be interleaved with other data, thus reducing the requirement for multiple communications links.

Typically voice digitizers are optimized for voice data only, utilizing a narrow bandwidth. A narrow band voice digitizer is capable of digitizing a human voice for digital transmission at approximately 2400 bits per second. The purpose of utilizing a narrow band voice digitizer is to obtain efficiency of data transmission. For example, a digital signal of 9600 bits per second may be transmitted by a data modem over a 3000 Hz spectrum space. As this 3000 Hz band is also approximately the same as for a normal telephone line, it can be seen that four digitized voice channels can be transmitted simultaneously.

However, normal high precision telephone system signalling, such as dialing pulses from a rotary dial telephone, tone signals from a TOUCH-TONE telephone system and call progress tone signals, cannot be transmitted properly by a narrow band voice digitizer. Therefore, unless a voice digitizer has the capability of transmitting and generating telephone system signalling data, the efficiency of a voice processor may be lost. This loss is due to the fact that one voice digitizer must be dedicated to one person at each end of the communications link or an operator must manually intervene to signal each party as he is called.

A need has thus arisen for a signal processor for use with a voice digitizer to transmit and receive telephone system signalling data present in a telephone system. Further, a need has arisen for a signal processor to overcome the limitation of existing voice digitizers that prevent accurate and complete telephone line interface signalling. Furthermore, a need has arisen for a signal processor for use with a voice digitizer having the capability of interfacing to a rotary and TOUCH-TONE telephone system.

SUMMARY OF THE INVENTION

The present invention substantially reduces or minimizes the problems heretofore associated with the use of voice digitizers in connection with a telephone communications system. In accordance with the present invention, a signal processor is provided to interface between a telephone system and a digital transmission system for digitizing telephone dialing signals including rotary dial pulses, TOUCH-TONE signals and call progress tone signals to enable a voice digitizer to transmit these precision telephone signals without distortion or limiting the digitized voice quality.

In accordance with a more specific aspect of the present invention, a system for encoding telephone dialing signals received from a telephone system at a transmitting station and transmitted using a digital transmission system to a receiving station for decoding and application to a telephone system at the receiving station includes circuitry connected to the telephone system at the transmitting station for detecting and receiving telephone dialing signals generated by the telephone system at the transmitting station. Circuitry is provided for storing the detected telephone dialing signals for a predetermined time period at the transmitting station. The system further includes circuitry interconnected between the circuitry for storing and the digital transmission system for selectively clocking the storing circuitry to generate digital representations of the telephone dialing signals for transmission to the receiving station. The system further includes circuitry connected to the digital transmission system at the receiving station for detecting and receiving transmitted digital representations of the telephone dialing signals generated by the telephone system at the transmitting station and circuitry for decoding the digital representations of the telephone dialing signals at the receiving station for application to the telephone system at the receiving station.

In accordance with another aspect of the present invention, a system for use with a digital transmission system for encoding telephone dialing signals from a telephone system at a transmitting station includes circuitry connected to the telephone system for detecting and receiving telephone dialing signals generated by the telephone system. Circuitry is provided for storing the detected telephone dialing signals for a predetermined time period. The system further includes circuitry interconnected to the circuitry for storing and the digital transmission system for selectively clocking the circuitry for storing to thereby generate digital representations of the telephone dialing signals for application to the digital transmission system for transmission to a receiving station.

In accordance with another aspect of the present invention, a system for use with a digital transmission system for decoding digital representations of telephone dialing signals for application to a telephone system at a receiving station includes circuitry connected to the digital transmission system at the receiving station for detecting and receiving digital representations of the telephone dialing signals from a transmitting station. Circuitry is provided for decoding the digital representations of the telephone dialing signals to generate a decoded representation of the telephone signals. The system further includes circuitry for applying the decoded representations of the telephone dialing signals to the telephone system at the receiving station.

In accordance with still another aspect of the present invention, a method of digitizing telephone dialing signals received from a telephone system at a transmitting station for transmission using a digital transmission system to a receiving station for decoding and use by a telephone system at the receiving station includes the steps of detecting and receiving at the transmitting station the telephone dialing signals from the telephone system. The method further includes storing the detected dialing signals for a predetermined time period at the transmitting station. An additional step of the present method is the selective clocking of the stored detected telephone dialing signals to generate digital representations of the telephone dialing signals for transmission to the receiving station. The method further includes the step of detecting and receiving at the receiving station the transmitted digital representations of the telephone dialing signals and decoding the digital representations of the telephone dialing signals for application to the telephone system at the receiving station.

DESCRIPTION OF THE DRAWINGS

A more complete understanding of the invention and its advantages may best be understood by reference to the following description taken in conjunction with the accompanying drawings in which:

FIG. 1 is a block diagram illustrating the connection of the present signal processor between a telephone system and a digital voice processor;

FIG. 2 is a detailed block diagram of the transmit and receive sections of the present signal processor for use with a telephone system utilizing rotary dial pulse signals;

FIG. 4 is a detailed schematic diagram of a portion of the transmit section of the present signal processor including the dial pulse interface circuit shown in block diagram form in FIG. 2;

FIG. 5 is a detailed schematic diagram of the receive section of the present signal processor including the input detector, memory, dialer disable, counter and driver shown in block diagram form in FIG. 2;

FIG. 6 is a detailed schematic diagram of the clock circuitry shown in block diagram form in FIG. 2;

FIG. 7 is a detailed schematic diagram of the echo suppression circuitry shown in block diagram form in FIG. 2;

DESCRIPTION OF THE PREFERRED EMBODIMENT

System Block Diagram

Figure 3:
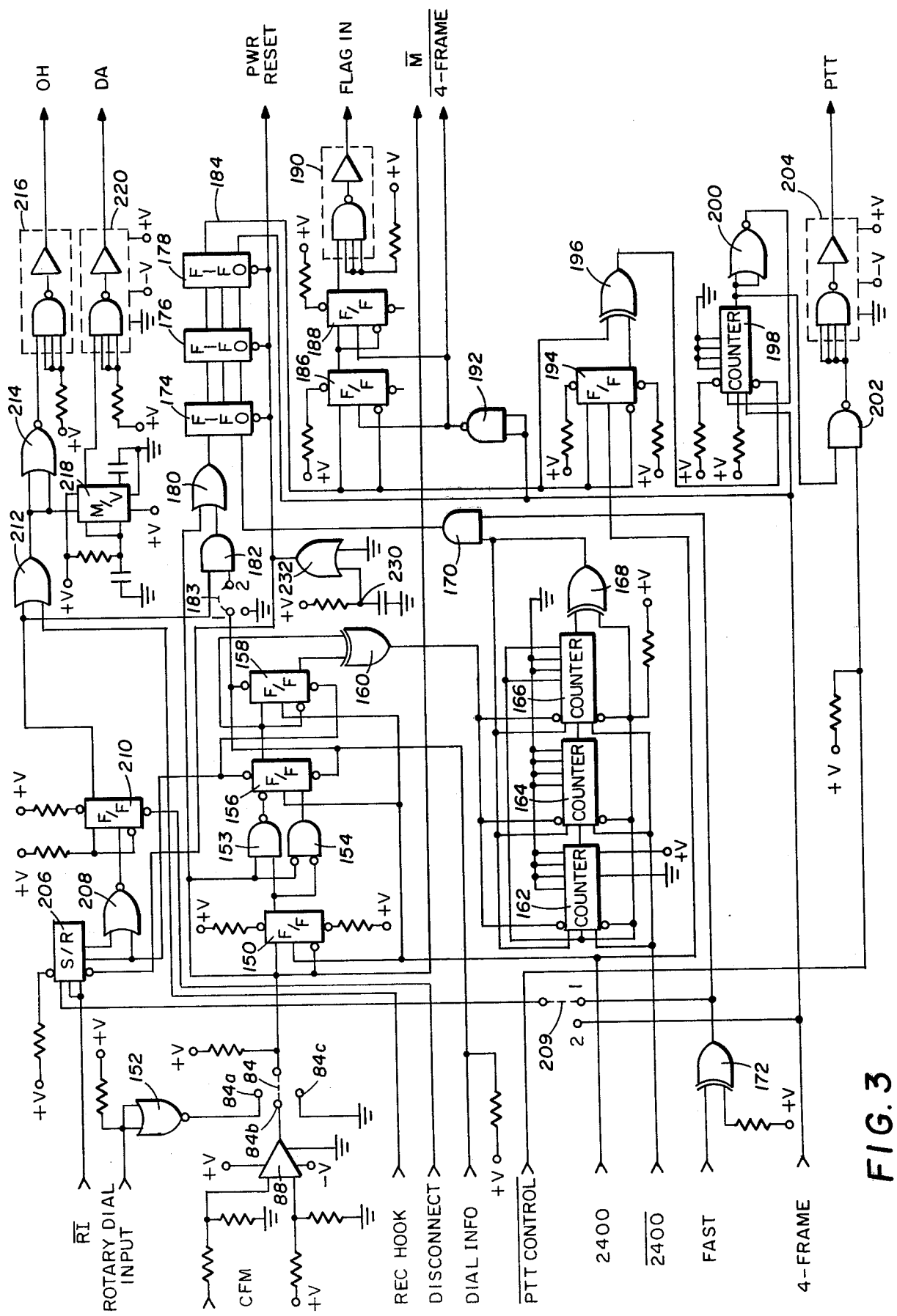
FIG. 3 is a detailed schematic diagram of a portion of the transmit section of the present signal processor including the comparator, mode select switch, input protection circuit, answer and off hook supervision circuitry, input change detector, memory and input formater shown in block diagram form in FIG. 2.

FIG. 1 illustrates a block diagram of the interconnection of the present signal processor 20 between a telephone system 22 and a digital voice processor 24. Telephone system 22 may comprise, for example, a private branch exchange (PBX), a Centrex system or the like. A telephone terminal 26 provides an input to telephone system 22 and may comprise a standard rotary dial or a TOUCH-TONE system. Where a TOUCH-TONE dialing system is utilized, the TOUCH-TONE dialing signals generated by a standard push-button set are transmitted over audio signal lines 28 between telephone system 22 and signal processor 20. In addition, call progress tone signals, such as dial tones and busy tones, to be subsequently described, are transmitted over the audio signal lines 28. In the case of rotary dial pulse signals generated by a rotary dial system at terminal 26, these pulse signals are transmitted via signalling lines 30 between telephone system 22 and signal processor 20.

TOUCH-TONE dialing signals, call progress tone signals and rotary dial pulse signals will hereinafter be collectively referred to as telephone dialing signals generated by a telephone system for application to the signal processor of the present invention. Additional telephone system signalling such as the E and M signals are also transmitted via signalling lines 30 between telephone system 22 and signal processor 20. Normal speech signals generated at telephone terminal 26 through telephone system 22 are transmitted to the signal processor 20 via audio lines 28.

Signal processor 20, as will be subsequently described in greater detail, detects the telephone dialing signals and converts these detected signals to digital format for transmission by the voice processor 24. Signal processor 20 transmits audio speech signals from audio lines 28 via audio lines 32 to voice processor 24, and signal processor 20 receives audio signals via audio lines 34 from voice processor 24. The digitized signalling data from signal processor 20 is applied via signal lines 36 to voice processor 34. Correspondingly, voice processor 24 transmits to signal processor 20 via E and M signal lines 36 when voice processor 24 operates in the receiving mode.

Voice processor 24 may comprise, for example, a solid state, all digital, adaptive speech processor which provides digitized speech out at a selectable data rate of 2400 bits per second or 4800 bits per second. Such a voice processor may have the capability of providing a single digitized speech circuit or be capable of multiplexing a single digitized speech circuit with other data bit streams to allow simultaneous voice and data transmission. Such voice processors are well known in the art and may comprise, for example, a voice analyzer data converter manufactured and sold by E-Systems, Inc., Garland Division, of Garland Tex.

Voice processor 24 is capable of operating both as a receiver and a transmitter. In a transmit mode of operation voice processor 24 encodes speech signals to digital signals for transmission to a remote location through a modem 38. As a receiver, voice processor 24 receives digital signals representing speech and encodes these digital representations of speech signals for application to telephone system 22. Transmission from voice processor 24 to modem 38 is accomplished by digital signal lines 40. Digitized speech signals from modem 38 are received by voice processor 24 via digital signal lines 42.

Modem 38 may comprise a standard modulator-demodulator for transforming the digitized voice signals and telephone dialing signals into a form suitable for transmission over a data link 44 to a receiving modem 46. Modems 38 and 46 may include standard terminal interfaces, such as EIA RS 232 or MIL-STD-188C terminal interfaces. The 2400 or 4800 bit per second data stream output by voice processor 24 may be converted to a 9600 bit per second data stream by modem 38 for transmission via the data link 44 to modem 46.

Modem 46 is interconnected to a voice processor 48 similar in operation to voice processor 24 previously described. Voice processor 48 is interconnected to a signal processor 50, which is interconnected to a telephone system 52. Signal processor 50 performs a similar function as signal processor 20. Modem 46 is interconnected to voice processor 48 via digital signal lines 54 and 56. Voice processor 48 receives digitized speech and telephone dialing signals for decoding via the digital signal lines 54 and applies to modem 46 encoded digitized speech and telephone dialing signals via digital signal lines 56. Audio signals are presented from signal processor 50 to voice processor 48 for digitizing via audio signal lines 58. Voice processor 48 presents decoded digitized voice signals received from modem 46 via digital signal lines 54 to signal processor 50 via audio signal lines 60. Signal lines 62 and 63 interconnect voice processor 48 and signal processor 50 and function to transmit telephone dialing signals and telephone data between voice processor 48 and signal processor 50. Signal processor 50 receives speech signals from telephone system 52 and transmits speech signals to telephone system 52 by audio signal lines 64. Telephone signalling is transmitted and received between signal processor 50 and telephone system 52 via signal lines 66. Telephone system 52 may comprise a system similar to telephone system 22 and includes a telephone terminal 68 capable of receiving and generating telephone dialing signals.

As will be subsequently described in detail, the signal processors 20 and 50 function in both a transmit and receive mode of operation. In a transmitting mode of operation, signal processors 20 and 50 receive telephone dialing signals from the telephone systems 22 and 52 and convert these telephone dialing signals to digital representations for application to voice processors 24 and 48 for transmission over the telephone data link 44. Correspondingly, signal processors 20 and 50 also receive digital representations of telephone dialing signals from voice processors 24 and 48 and convert these to analog or tone signals depending upon the type of telephone systems 22 or 52 being utilized for application to telephone systems 22 or 52 in order to complete a communications path between telephone terminals 26 and 68.

The process of placing a telephone call from telephone terminal 26 to telephone terminal 68 will now be briefly described. A telephone caller at telephone terminal 26 will initiate a call by indicating a "ring" condition on a "TIP" and "RING" line or by operating the M signal line 30. This indication will be generated by the caller dialing a PBX extension or access code to signal processor 20. This initiation will cause a −48 volt potential to be present on the M signal line 30 indicating to signal processor 20 that the caller is ready to place a call from telephone terminal 26. The data on the M signal line 30 is then processed through signal processor 20 and transmitted via E and M signal lines 36 to voice processor 24.

The indication that the M signal line 30 has gone to a −48 volt potential is transmitted in digital form through modem 38 via data link 44 to modem 46, through voice processor 48 and via E and M signal line 62 to signal processor 50. Signal processor 50 will decode the digitized signal and apply this indication via the E signal line 66 for application to telephone system 52. This application causes the E signal line 66 to be grounded to generate an "off hook" signal to thereby generate a dial tone over audio signal lines 64 to signal processor 50. Signal processor 50 will continuously encode the dial tone into digital format for application via the data link 44 to signal processor 20. Signal processor 20 encodes this signal to indicate to the calling party at telephone terminal 26 that he may begin to input a telephone number into telephone system 22. The dial tone generated by telephone system 52 is continuously encoded and decoded by signal processors 50 and 20 until the calling party inputs the telephone number of the called party into telephone system 22.

Depending upon the type of telephone terminal 26, the calling party will either depress the TOUCH-TONE signal push-buttons or dial the telephone number using a rotary dial. The TOUCH-TONE signals generated by a TOUCH-TONE telephone system will be transmitted to signal processor 20 via audio signal lines 28. Rotary dial pulses will be transmitted via signal lines 30 to signal processor 20. In either instance, signal processor 20 will encode the received telephone dialing signals into digital signals and format these digital signals into a digital word for transmission over data link 44. Further, signal processor 20 will store these digital words and transmit the stored digital words at a slower rate than they were received by signal processor 20 for application to voice processor 24. Since the signal channels of voice processor 24 are considerably slower than the rate at which the telephone dialing signals from telephone system 22 are received, the telephone dialing signals received by signal processor 20 are stored and then output at a slower rate to enable voice processor 24 to receive and transmit the digital encoded information over data link 44. In the preferred embodiment, the telephone dialing signals are presented to voice processor 24 at approximately two and one-half times slower than this information was presented to signal processor 20.

The signalling on M line 30 between telephone system 22 and signal processor 20 where telephone system 22 is a rotary type system is a series of pulses corresponding to the digit dialed at the telephone terminal 26.

These pulses are generated at a rate of 10 pulses per second and fluctuate between the −48 volt potential and 0 volt potential. The duty cycle of these pulses is in a ratio of 60 to 40 milliseconds. Each time a pulse is generated, the voltage potential on M signalling line 30 will be 0 volts for 60 milliseconds. Where the telephone system 22 is capable of receiving TOUCH-TONE signals from telephone terminal 26, the M signalling line 30 is maintained at a constant −48 volt potential.

The TOUCH-TONE push-buttons at telephone terminal 26 generate unique tones corresponding to specific digits which are presented via audio signal lines 28 to signal processor 20. Signal processor 20 in turn detects these tones, converts these tones into a digital word and applies the digitized telephone dialing signals to voice processor 24 for application via data link 44 to voice processor 48. The received telephone dialing signals from voice processor 48 are applied via audio signal lines 60 to signal processor 50. Signal processor 50 detects the digitized telephone dialing signals and produces control signals to TOUCH-TONE oscillators contained within signal processor 50 to regenerate the telephone dialing signals for application via audio signal lines 64 to telephone system 52. During the entire time period in which the digital telephone dialing signals are transmitted, the voice processors 24 and 48 are clamped such that digitized voice signals are not transmitted during this mode of operation.

After the calling party at telephone terminal 26 has completed dialing the telephone number of the called party, telephone system 52 completes the call to telephone terminal 68. Telephone system 52 then produces an audible ring back tone through the system to the calling party at telephone terminal 26 to indicate to the calling party that the call has been completed. The signal processor 50 detects and encodes these audible ring back tones using the same circuitry utilized by signal processor 20 to digitize telephone dialing signals generated by telephone system 22.

When the called party at telephone terminal 68 answers his telephone and goes "off hook" the M signalling line 66 will drop to a −48 voltage potential. This indication will be transmitted to signal processor 50 for encoding into digital information. The digitized signal will be transmitted via the off hook signal line 63 to voice processor 48 for transmission via data link 44 to signal processor 20 to ground the E signal lead 30 of telephone system 22. The grounding of E signal lead 30 indicates that the call initiated from telephone terminal 26 has been completed. After the connection has been completed, voice processors 24 and 48 are unclamped to encode and decode digitized voice signals while signal processors 20 and 50 are clamped off to prevent false signalling.

Signal Designations

To assist in explanation of the present system, the following is a tabulation of some of the more important pneumonics used to denote some of the signals in the system. Signals having a suffix "-" or bar "2400" designate the inverted form of the signal.

| Signal | Definition |
| --- | --- |
| CFM, M | M lead signal generated by telephone system |
| Rotary Dial Input | Signal input from a remote phone, independent from telephone system |
| 2400 | External clock signal of 2400 bits per second |

-continued

| Signal | Definition |
| --- | --- |
| FAST | Internal clock signal of 37 msec, input memory clock |
| SLOW | Internal clock signal of 93 msec |
| DIAL | Internal clock signal of 10 msec. |
| 4-FRAME | Internal clock signal of 90 msec. |
| FLAG IN | Input to voice processor |
| PTT CONTROL | Signal to voice processor to disable voice channel |
| RI | Ring input signal to signal processor generated by telephone system data coupler |
| OH | Off hook signal generated by system for output to data coupler |
| REC HOOK | Receive hook signal indicates call initiated |
| DA | Data access signal, delayed signal for use by data coupler to break audio path |
| DISCONNECT | Signal to data coupler to cause off hook lead to relense |
| DIAL INFO | Monitor signal for output of data coupler |
| PWR RESET | Power Reset signal to reset system after power-up |
| T | Input "Tip" lead from telephone system |
| FLAG OUT, RMT CALL OUT | Output from voice processor |
| CFE, E | E lead signal generated by telephone system |
| AUDIO INPUT | Audio input to signal processor from telephone system |
| TT-0, TT-1, TT-2, TT-3 | Output of tone conersion ROM, 4-bit code |
| SAM-TT | Sample TOUCH-TONE signal indicating valid tone present at output of conversion ROM |
| CT0, CT1, CT2, CT3 | Call progress tone code signals output of priority encoder |

Rotary Dial System Block Diagram

FIG. 2 illustrates a detailed block diagram of the interconnection of signal processors 20 and 50, wherein like numerals are utilized for like and corresponding elements previously identified. FIG. 2 illustrates a transmit section 80 and a receive section 82 of the present signal processor corresponding to the functions performed by signal processor 20 and signal processor 50 (FIG. 1). It should be understood that the signal processor of the present invention has the capability of receiving telephone dialing signals from a telephone system for encoding into digital representations for transmission to a receiving station and also has the capability of receiving digital representations of telephone dialing signals for decoding into telephone dialing signals for application to a telephone system. FIG. 2 has been illustrated for purposes of discussion as showing signal processor 20 as performing only a transmitting function, while signal processor 50 functions only as a receiving signal processor.

The transmit section 80 of signal processor 20 has the capability of receiving telephone dialing signals from three modes of operation. The first mode of operation is to receive telephone dialing signals directly from the M signalling lead 30 from the telephone system 22. The second mode of operation is through a data coupler interconnected to telephone system 22, and the third mode of operation is from a rotary dial input signal generated by a remote telephone not connected to the telephone system 22. The selection of the particular mode of operation of signal processor 20 is controlled by a mode select switch 84 having positions 84a, 84b and 84c. In position 84a, rotary dial input signals are received from a remote telephone for input to a protection circuit 86. When mode select switch 84 is positioned in position 84b, telephone dialing signals are received via the M signal line 30 through a comparator 88 for application to input protection circuit 86. Comparator 88 receives the rotary dial pulse signals at either a 0 or −48 volt potential and translates these voltages to 0 and 3 volt potential levels for use by the circuitry of signal processor 20.

The third mode of operation of the present signal processor 20 is achieved by positioning mode select switch 84 to position 84c to use the system in connection with a data coupler 90. Data coupler 90 may comprise, for example, Model 1001-F data coupler manufactured and sold by General Telephone & Electronics. Data coupler 90 generates the RI-signal for application to an answer and off hook supervision circuit 92. The RI-signal is generated when a caller dials the coupler and it begins to ring. The answer and off hook supervision circuitry 92 generates the OH and DH signals for application to data coupler 90. Data coupler 90 then generates an output to a dial pulse interface circuit 94, which generates the DIAL INFO output signal for application to the input protection circuit 86. Dial pulse interface circuit 94 also generates the disconnect signal for application to answer and off hook supervision circuit 92. The operation of the dial pulse interface circuit 94 and answer and off hook supervision circuit 92 will be subsequently described in connection with FIG. 4.

Input protection circuit 86 receives the rotary dial pulse signals from either of the three modes of operation of signal processor 20. Input protection circuit 86 functions to prevent noise from entering the system by sensing only pulses longer than 2400 Hz clocks. The output of input protection circuit 86 is applied to an input change detector 96, which generates an output pulse to input formatting circuitry 98 each time a change is detected. Input formatting circuitry 98 generates a clock pulse to first-in-first-out (FIFO) memory circuits 100, which clock the rotary dial pulse signals presented to input protection circuit 86 into FIFO memory circuits 100.

The input formatting circuitry 98 clocks in the rotary dial pulse signals at the FAST clock rate, while clocking out the rotary dial pulse signals from FIFO memory circuitry 100 at the 4-FRAME clock rate. Through this procedure, the signalling rate of the rotary dial pulses are sufficiently slowed for application via the FLAG IN signal to voice processor 24. Input formatting circuitry 98 also generates the PIT output signal for application to voice processor 24 to disable the voice channel of voice processor 24 when telephone dialing signals are being processed and transmitted through the signal processor 20. The output of voice processor 24 therefore, represents digital representations of the rotary dial pulse signals applied to signal processor 20 either from a remote telephone, telephone system 22 or data coupler 90. These digital representations of rotary pulse signals are applied via digital signal lines 40 to modem 38.

Voice processor 24 is also interconnected to an external clock select switch 102, which functions to select either a 2400 or 4800 bit per second clock generated by voice processor 24. The output of external clock select switch 102 is applied to clock circuitry 104 to generate the FAST, SLOW, DIAL and 4-FRAME clocking signals utilized by signal processor 20.

An output of telephone system 22 is applied via audio signal lines 28 to echo suppression circuitry 110, whose output is applied to voice processor 24. Echo suppression circuitry 110 functions to balance the output of voice processor 24 to prevent the called party from detecting an echo transmitted through the transmit section 80 of the communications link.

FIG. 2 also illustrates in block diagram form the receive section 82 of signal processor 50. The digital representations of the telephone dialing signals are applied from data link 44 to modem 46 for application to voice processor 48. The output, FLAG OUT-signal from voice processor 48 represents the digital representations of the telephone dialing signals and is applied to an input detector 120. Whenever a change of transition in the FLAG OUT-signal is detected by input detector 120 an output signal is generated to dialer disable circuit 122. The output of dialer disable circuit 122 is applied to FIFO memory circuits 124. This output functions to stop all output clocks from being applied to FIFO memory circuits 124 to prevent a number from being prematurely dialed out from signal processor 50.

A second output of input detector 120 is applied to a counter 126, whose output is applied to FIFO memory circuits 124. Counter 126 functions to generate the proper duty cycle for outputting the stored digital representations of the telephone dialing signals applied from input detector 120 to the FIFO memory circuits 124. Input detector 120 functions to enable counter 126 to clock FIFO memory circuits 124 at the FAST clock rate. The application of the FAST clock decodes the digital representations of the telephone dialing signals back to their original speed for application to telephone system 52.

The output of FIFO memory circuits 124 generates the REC HOOK signal along signal line 130 for application to an answer and off hook supervision circuit 92'. Answer and off hook supervision circuit 92' functions in a manner similar to answer and off hook supervision circuit 92 of the transmit section 80 to be subsequently described. FIFO memory circuits 124 also provide an output to an E lead driver 132 to generate the E signal ground closure on E lead 66 to establish the communications link at the telephone system 52.

Voice processor 48 is interconnected to echo suppression circuitry 134, which functions in a similar manner to echo suppression circuitry 110 of the transmit section 80 of signal processor 20. Voice processor 48 is also interconnected to an external clock select switch 136, whose output is applied to clock circuitry 138 to generate the FAST, SLOW, DIAL and 4-FRAME clocking signals. These clocking signals are utilized by signal processor 50 of the receive section 82 in a manner similar to the clock signals generated by external clock select switch 102 and clock circuitry 104 of the transmit section 80.

Rotary Dial Schematic Circuitry

FIG. 3 illustrates in schematic detail the circuitry corresponding to comparator 88, mode select switch 84, input protection circuit 86, answer and off hook supervision circuitry 92, input change detector 96, FIFO memory circuits 100 and input formatting circuitry 98 shown in block diagram form in FIG. 2. The CFM signal from telephone system 22 is applied to comparator 88, whose output is applied through mode select switch 84 to a flip-flop 150. Comparator 88 may comprise, for example, an LM211D I/C. Mode select switch 84 may be positioned in position 84a to apply rotary dial input signals from a remote telephone through NOR gate 152 to flip-flop 150. In the third position, 84c of mode select switch 84, the input to flip-flop 150 is at ground potential. In this third position, input to signal processor 20 is supplied from data coupler 90 (FIG. 2). Comparator 88 functions to translate the 0 and −48 volt potentials applied on the CFM signal line to TTL signal voltage potentials for use by the system.

The output of flip-flop 150 is applied to a NAND gate 153 and an AND gate 154 to a flip-flop 156. The 2400 clock signal is also applied to flip-flops 150 and 156 to clock flip-flops 150 and 156 in order to generate an output when a signal at least as long as two 2400 Hz clocks is detected. The output of flip-flop 156 is applied to a flip-flop 158, whose output is applied to an exclusive OR gate 160. Flip-flops 150 and 156 and NAND gate 153 and AND gate 154 comprise the input protection circuit 86 (FIG. 2). Flip-flop 158 and exclusive OR gate 160 comprise the input change detector circuit 96 (FIG. 2).

Upon detection of a signal level change by flip-flop 158, exclusive OR gate 160 will apply a low going pulse to preload a number into counters 162, 164 and 166. Counters 162, 164 and 166 may comprise, for example, 4-bit binary counters. Counters 162, 164 and 166 receive the 2400-clock signal and apply an output through an exclusive OR gate 168 to an AND gate 170. AND gate 170 receives the FAST clock signal through an exclusive OR gate 172 to apply the FAST clock signal to first-in-first-out shift registers 174, 176 and 178, which comprise the FIFO memory circuits 100 (FIG. 2). First-in-first-out shift registers 174, 176 and 178 may comprise, for example, 3341 FIFOs.

The CFM signal is therefore clocked into FIFOs 174, 176 and 178 the control of the FAST clock signal through an OR gate 180. OR gate 180 also receives an input from an AND gate 182, which may be strapped using strap 183 to receive the DIAL INFO signal in position 1 or to ground potential in position 2. The output of the FIFOs 174, 176 and 178 is clocked constantly with the 4-FRAME clock signal to output the stored telephone dialing signals on signal line 184. Therefore, if any information is applied to FIFOs 174, 176 and 178 this data will be filtered through each FIFO 174, 176 and 178. When the data is present at the output of FIFO 178, this information will be immediately clocked out at the slower 4-FRAME rate as compared to the FAST clock input rate.

The output of FIFO 178 is applied via signal line 184 to flip-flops 186 and 188 to a line driver 190. Line driver 190 generates the FLAG IN signal for application to voice processor 24 (FIG. 2). The 4-FRAME clock signal is applied to flip-flops 186 and 188 through a NAND gate 192.

The output of FIFO 178 is also applied via signal line 184 to a flip-flop 194 and an exclusive OR gate 196. Flip-flop 194 and exclusive OR gate 196 comprise a transition detector to enable a counter 198. Counter 198 is a 4-bit binary counter and may comprise, for example, a 93L16 I/C. The output of counter 198 is applied to a NOR gate 200 and a NAND gate 202. NAND gate 202 also receives the PTT CONTROL-signal to generate the PTT output signal through a line driver 204. Each time a transition is detected by flip-flop 194 and exclusive OR gate 196, counter 198 is reset. For each transition, the PTT signal is held low for approximately 1.4 seconds.

The RI-signal is applied to a shift register 206. Shift register 206 is a 4-bit parallel access shift register and may comprise, for example, a 74195 I/C. Depending upon the position of a strap 209, shift register 206 also receives the FAST clock signal, strap 209 in position 1, or the 4-FRAME clock signal, strap 209 in position 2. The RI-signal is generated in connection with the use of the present system with data coupler 90 (FIG. 2).

When the telephone caller dials the data coupler, the coupler begins ringing at the coupler side of the RI line and the RI line will go low for the duration of the ring. Shift register 206 samples the RI-signal and if the RI-signal goes low for two samples of 36 milliseconds each, shift register 206 will generate an output through a NOR gate 208 to a flip-flop 210. The output of flip-flop 210 is applied to an OR gate 212, whose output is applied to a NOR gate 214. The output of NOR gate 214 is applied to a line driver 216 to generate the OH signal for application back to the data coupler 90. The output of OR gate 212 is also applied to a multivibrator 218, which may comprise for example, an NE555 I/C. The output of multivibrator 218 is applied to a line driver 220 to generate the DA signal. OR gate 212 also receives as an input the REC HOOK signal, which enables OR gate 212 to generate the OH signal. Whenever the OH signal is generated, the audio channel of the data coupler 90 (FIG. 2) is disabled. While the telephone caller is continuously dialing, flip-flop 210 is repeatedly reset until the last pulse has been received. Receipt of the last pulse enables the audio channel of data coupler 90. The DISCONNECT signal is applied to flip-flop 210 to reset flip-flop 210 causing the OFF HOOK signal to release connection. Shift register 206, flip-flop 210, OR gate 212, NOR gate 214, multivibrator 218 and line drivers 216 and 220 comprise the answer and off hook supervision circuitry 92 shown in block diagram form in FIG. 2.

As previously stated, signal processor 20 is capable of receiving telephone dialing signals from three sources, a remote telephone, from the M signal lead of the telephone system or from a data coupler 90 (FIG. 2). The telephone dialing signals when received from a data coupler 90 are applied via the DIAL INFO signal to AND gate 182. The generation of the DIAL INFO signal will be discussed in connection with FIG. 4.

The power reset signal is generated using a resistor-capacitor network 230 and an OR gate 232. Whenever power is applied to the system, the power reset signal is low for approximately 10 to 15 milliseconds. The power reset signal remains in a high state until the power is disconnected from the system.

To summarize the operation of the circuitry shown in FIG. 3, flip-flop 158 of the input change detector 96 (FIG. 2) enables the FAST clock to the FIFOs 174, 176 and 178, whenever there is a signal level change in the dial pulse M lead status. The FAST clock will run 0.6 second after activity stops on the M lead. The 0.6 second interval between dialed digits allows a space to be loaded into FIFOs 174, 176 and 178 after the dial signal pulses terminate. Anytime the dial pulse M lead changes state, flip-flop 158 enables counters 162, 164 and 166 for another 0.6 second interval. This procedure allows the FAST clock to sample the full set of dialing pulses at a sample rate of approximately 37 milliseconds to insure that the dialing pulses are sampled at least once in each high or low state. Since the dialing pulses have a period of 100 milliseconds, it is possible that a high or low state may be sampled more than once for any one pulse. FIFOs 174, 176 and 178 are then clocked by the 4-FRAME clock pulse to generate an output that slows the dialing pulses to a rate acceptable by voice processor 24 (FIG. 2).

As previously stated, an input to the signal processor 20 may be supplied directly from the telephone line itself. The DIAL INFO signal is applied to the FIFOs 174, 176 and 178. The dial pulse interface circuitry 94 (FIG. 2) is utilized to generate this input.

Referring to FIG. 4, the circuitry in schematic detail for the dial pulse interface circuit 94 shown in block diagram form in FIG. 2 is illustrated. The input to the dial pulse interface circuit 94 is provided from the T lead of the telephone system 22 (FIG. 2). The input signal via the T lead is applied to a limiting diode 250 to establish a threshold voltage level, such that any voltage below this threshold level will not appear after the output of diode 250. The output of diode 250 is applied to an amplifier 252 whose output is applied to a comparator 254. Amplifier 252 may comprise, for example, a 747 I/C, and comparator 254 may comprise, for example, an LM211D I/C. The function of limiting diode 250, amplifier 252 and comparator 254 is to detect positive transitions appearing on the T lead.

The negative transitions on the T lead are applied to a limiting diode 256 to establish a threshold voltage level for the negative transitions. The output of limiting diode 256 is applied to an amplifier 258. Amplifier 258 may comprise, for example, a 747 I/C. The output of amplifier 258 is applied to a NAND gate 260, whose output is applied to a multivibrator 262. Multivibrator 262 may comprise, for example, an NE555 I/C. The output of multivibrator 262 is applied to a NAND gate 264, which also receives the output of comparator 254 through an inverter 266. The output of NAND gate 264 is applied to a NAND gate 268, whose output is applied through an inverter 270 to a flip-flop 272. The output of flip-flop 272 is applied to a flip-flop 274, whose output is applied to a flip-flop 276 to generate the DIAL INFO signal. Each time the flip-flop 272 receives an output pulse from NAND gate 264, it will generate one pulse on the DIAL INFO signal line which will be in turn clocked into FIFOs 174, 176 and 178 (FIG. 3). Flip-flop 272 is clocked by two 2400 clock pulses applied to flip-flop 278, whose output is applied to a flip-flop 280.

FIG. 4 also illustrates the circuitry required to generate the disconnect signal. Voltage comparators 290 and 292 establish a voltage window centered around 10 volts to provide a 3.6 volt window. Voltage comparators 290 and 292 may comprise, for example, LM339 I/Cs. The output of comparators 290 and 292 are applied through a NAND gate 294 through an inverter 296 to a shift register 298. Shift register 298 is a 4-bit parallel access shift register and may comprise, for example, a 74195 I/C. The DIAL signal is applied to a counter 300 and to a NAND gate 302 through an inverter 304. The output of NAND gate 302 is also applied to shift register 298. Whenever the DIAL signal reaches a −10 volt potential, it satisfies the window created by voltage comparators 290 and 292 to cause the signal to be sampled by shift register 298 whenever two clocks have been received. The output of shift register 298 is applied through a NAND gate 306 to a NAND gate 308, whose output is applied to a NAND gate 310 to generate the disconnect signal.

Referring to FIG. 5, the schematic circuitry corresponding to the receive section 82 of the signal processor 50 including the input detector circuitry 120, FIFO memory circuit 124, E lead driver 132, dialer disable circuitry 122 and counter 126 illustrated in block diagram form in FIG. 2 is illustrated. The FLAG OUT-signal from voice processor 48 representing the digital representations of telephone dialing signals produced by telephone system 22 (FIG. 1) are applied to a flip-flop 330. The output of flip-flop 330 is applied to a flip-flop 332, whose output is applied to a flip-flop 334 and an exclusive OR gate 336. The output of flip-flop 334 is applied to a first-in-first-out register 338, whose output is applied to first-in-first-out register 340. First-in-first-out registers 338 and 340 may comprise, for example, 3341 FIFOs.

The output of exclusive OR gate 336 is applied to a counter 342, which also receives as an input the 4-FRAME-clock signal. Counter 342 is a 4-bit binary counter and may comprise, for example, a 93L16 I/C. An output of counter 342 is applied to NAND gate 344 whose output is reapplied to counter 342. An additional output of counter 342 is applied to a NAND gate 346 together with the DIAL clock signal. The output of NAND gate 346 is applied through a NOR gate 348 to FIFOs 340 and 338. When a transition is detected by flip-flop 332 and exclusive OR gate 336, counter 342 is preloaded with a number, thereby inhibiting the DIAL signal from being applied to FIFOs 338 and 340. This circuitry prevents stored data in FIFOs 338 and 340 from being dialed out prematurely. After counter 342 has clocked out, it will enable the DIAL clock signal through NAND gate 346 to allow any DIAL pulses in the FIFOs 338 and 340 to be clocked out. These DIAL pulses will be clocked out before any additional pulses from a new number received by flip-flop 330 will be applied to FIFOs 338 and 340. Flip-flops 330, 332 and 334 comprise the input detector circuitry 120 represented in block diagram form in FIG. 2. Exclusive OR gate 336, counter 342, and NAND gates 344 and 346 comprise the dialer disable circuitry 122 in FIG. 2. FIFOs 338 and 340 comprise the FIFO memory circuitry 124 shown in FIG. 2.

The output of flip-flop 334 is also applied to a counter 350 and is applied through an exclusive OR gate 352 to a counter 354. Counters 350 and 354 are 4-bit binary counters, and may comprise, for example, 93L16 I/Cs. The output of counter 350 is applied to an exclusive OR gate 356, whose output is applied to NAND gate 358. The output of NAND gate 358 is applied to an exclusive NOR gate 360 which also receives as an input signal the 2400-clock signal. The output of exclusive NOR gate 360 is applied to NOR gate 362 whose output is provided to FIFOs 338 and 340. The output of counter 354 is applied to an exclusive OR gate 364, whose output is applied to NAND gate 366. The output of NAND gate 366 is applied to an exclusive NOR gate 368, which also receives as an input the 2400-clock signal. The output of exclusive NOR gate 368 is applied to NOR gate 362 whose output is applied to FIFOs 338 and 340. Counters 350 and 354 and their associated gates comprise the counter 126 represented in block diagram form in FIG. 2. The purpose of counters 350 and 354 is to establish the proper duty cycle for the decoded digited telephone dialing signals for application to the called telephone system 52 (FIG. 1).

Initially the dialer disable circuit 122 is loaded to inhibit the loading of clocks of the DIAL clock signal to the out puts of FIFOs 338 and 340. FIFOs 338 and 340 are then loaded by alternatively outputting data from counters 350 and 354 to FIFOs 338 and 340. When there is a transition from a low to a high on the FLAG OUT-signal as detected by flip-flop 334, counter 350 is enabled which allows six clocks of the 2400 bit per second clock signal to shift in six ones into the FIFOs 338 and 340. After these six bits of a one have been clocked into the FIFOs 338 and 340, counter 350 times out, and it is no longer enabled. Counter 350 cannot continue to count unless it is preloaded again. When the FLAG OUT-signal goes back low, as detected by flip-flop 334, counter 354 is enabled. This allows four counts of the 2400 bit per second clock signal to shift four zeros into the FIFOs 338 and 340. By altering the number which is loaded into counters 350 and 354, the duty cycle of the output pulse may be adjusted in 10% increments. The duty cycle created is therefore 60% high due to the output of counter 350 and 40% low due to the output of counter 354 to thereby clock ten bits of information for each one dialing pulse to be output from the signal processor 50. Once fully loaded, FIFOs 338 and 340 are then clocked to output the stored data at a rate of one clock per 10 milliseconds. This rate is ten times the dialing rate to output the telephone dialing signals at their original speed. Because the encoding circuitry of signal processor 20 when sampling the input telephone dialing signals maintained at least a 0.6 second interval between dialing pulses, this interval was clocked into the FIFOs 174, 176 and 178 (FIG. 3) of the transmit portion of signal processor 20. This 0.6 second interval appears as 2.5 times greater or approximately 1½ seconds between dialing pulses in the receive section 82 of signal processor 50. Therefore, if no transition in the FLAG OUT-signal is detected within a certain amount of time, the counter 342 will permit the data stored in FIFOs 338 and 340 to be clocked out. Whenever the FIFOs 338 and 340 are emptied, they continue to output the last state that was stored in memory until counter 342 of the dialer disable circuitry 122 (FIG. 2) inhibits the output at FIFOs 338 and 340 as previously described.

The output of FIFOs 338 and 340 is applied to a flip-flop 370. The output of flip-flop 370 generates the REC HOOK signal, which is applied to flip-flop 210 (FIG. 3) when using the present signal processor 20 in connection with a data coupler. The output of flip-flop 370 is also applied to a PNP driver transistor 372, whose output is connected to a negative voltage relay driver 374 when a strap 376 is positioned in position 376a as shown in FIG. 5. The output of relay driver 374 generates the CFE output signal. Strap 376 when positioned in position 376a provides a contact closure for a relay 378 to generate the CFE return connect signal. This third output of flip-flop 370 can be utilized in systems in which a contact closure is only required between the E lead and the system ground to provide the E lead signal.

Referring to FIG. 6, the circuitry corresponding to the external clock select switches 102 and 136 and the clock circuitries 104 and 138 shown in block diagram form in FIG. 2 is illustrated. The clock in signal is applied from the voice processor 24 or voice processor 48 to a NAND gate 390. External clock select switch 102 can be positioned to receive an external 4800 bit per second clock by positioning external clock select switch 102 to contact the 102b contact and 102c contact. To select an external clock of 2400 bit per second switch 102 is positioned to contact the 102a and 102d contacts. An internal 4800 bit per second clock is generated by a multivibrator 392 and is selected by the external clock select switch 102 by positioning switch 102 to contacts 102b and 102c. Multivibrator 392 may comprise, for example, an NE555 I/C.

The output of NAND gate 390 is applied to NOR gate 394 which also receives an output from a flip-flop 395. The output of NOR gate 394 is applied to a NOR gate 396 whose output is applied to a NAND gate 398. The output of NAND gate 398 is applied to counters 400 and 402. Counters 400 and 402 are 4-bit binary counters and may comprise, for example, 93L16 I/Cs. The output of counters 400 and 402 is applied to a NAND gate 404, which also receives an input from NOR gate 406 to generate the FAST clocking signal.

The output of NAND gate 398 is also applied to a counter 408 and a counter 410. Counters 408 and 410 are 4-bit binary counters and may comprise, for example 93L16 I/Cs. The output of counters 408 and 410 is applied to a NAND gate 412, which also receives an input from NOR gate 406 to generate the SLOW clocking signal.

The output of NAND gate 398 is also applied to a counter 414 and a counter 416. The output of counters 414 and 416 is applied to a NAND gate 418, which also receives an input from NOR gate 406 to generate the 4-frame clocking signal. Similarly, an output of NAND gate 398 is applied to a counter 420 and a counter 422. The output of counters 420 and 422 is applied to a NAND gate 424, which also receives an input from NOR gate 406 to generate the DIAL clocking signal. Counters 414, 416, 420 and 422 are 4-bit binary counters, and may comprise, for example, 93L16 I/Cs.

The output of NAND gate 398 is applied to a NAND gate 426 to generate the 2400 clocking signal. The clocking circuitry 104 further includes NAND gates 428 and 430 which receive the RI and FLAG OUT signals to generate the RI- and FLAG OUT-signals.

FIG. 7 illustrates the echo suppression circuitries 110 and 134 shown in block diagram form in FIG. 2. The output of the voice processor 48 is applied to a buffer amplifier 450 which drives a resistor-capacitor network 452. Buffer amplifier 450 may comprise, for example, a 747 I/C. When voice signals are present, the resistor-capacitor network 452 charges to a voltage above a predetermined level. This voltage level is monitored by a voltage comparator 454. Voltage comparator 454 may comprise, for example, an LM211 I/C. Whenever the voltage level of the resistor-capacitor network 452 exceeds the predetermined level, an output of voltage comparator 454 is generated and is applied through a NAND gate 456 to an analog switch 458. Analog switch 458 may comprise, for example, an AD7513 I/C. NAND gate 456 also receives as an input the echo suppression control signal through a NAND gate 460. When analog switch 458 receives an output from NAND gate 456, it will open to turn off the audio portion transmitted by voice processor 48 (FIG. 2). Switches 462 and 464 in the ground position disable to echo suppressor. Strap 466 in the normal position will also disable the echo suppressor. The hybrid transmit signal is applied to analog switch 458 for input into the voice processor in the receive mode of the echo suppression circuitry 110 (FIG. 2).

Figure 8:
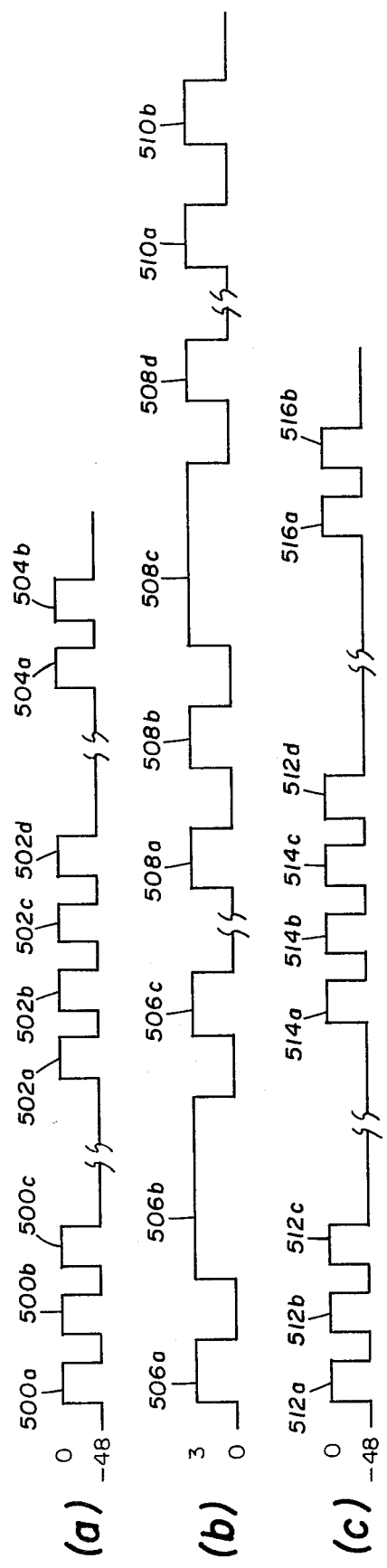
FIG. 8 is a representation of the rotary dial pulse signals as processed by the present signal processor.

FIG. 8 is a representation of the rotary telephone dialing signals as processed by the signal processors 20 and 50 (FIG. 1) operating in the transmit and receive modes of operation. FIG. 8(a) illustrates rotary dial pulse signals generated by a telephone system 22 (FIG. 1) representing the dialed digits "3" followed by the digit "4" followed by the digit "2". Pulses 500a, 500b and 500c represent the dialed digit "3", pulses 502a, 502b, 502c and 502d represent the dialed digit "4" and pulses 504a and 504b represent the dialed digit "2". As previously explained, the duty cycle of the rotary dial pulses is in a ratio 6 to 4 where the total length of a pulse is 100 milliseconds. The pulses are high for a period of 60 milliseconds and are low for a period of 40 milliseconds. The time interval between the dialed digits, such as between pulses 500c and 502a, is a minimum of 0.6 second.

FIG. 8(b) represents the rotary telephone dialing pulses shown in FIG. 8(a) after they have been processed to digital signals by signal processor 20 (FIG. 1) and are ready for application to voice processor 24 for transmission to a receiving station. The voltage levels correspond to a low of 0 and a high of 3. The pulse widths are 90 milliseconds or miltiples of 90-milliseconds in length. The multiple pulse width is caused by the sampling rate of 36 milliseconds by signal processor 20 such that a single pulse, such as pulse 500b of FIG. 8(a), may be sampled twice to generate the corresponding pulse 506b. The duration of the digital pulses 506, 508 and 510 is unimportant since it is only the transition between the pulses, such as between 506a, 506b and 506c, which is detected by the receive section 82 of signal processor 50 (FIG. 1) in the process of decoding the digital telephone dialing signals for application to the called telephone system 52 (FIG. 1). The time interval between digitized pulses corresponding to specific digits dialed is a minimum of 1.5 seconds because the 0.6 second interval shown in FIG. 8(a) is expanded by a factor of 2½ times.

FIG. 8(c) represents the decoded digital rotary telephone dialing pulse signals for application to the called telephone system 52 and correspond to those rotary telephone dialing pulses shown in FIG. 8(a). Specifically, pulses 512 correspond to pulses 500, pulses 514 correspond to pulses 502 and pulses 516 correspond to pulses 504. The time interval between pulses 512c and 512a is at the expanded interval of 1.5 seconds corresponding to the time precoded interval between pulses 506c and 508a.

Touch-Tone System Block Diagram

Figure 9:
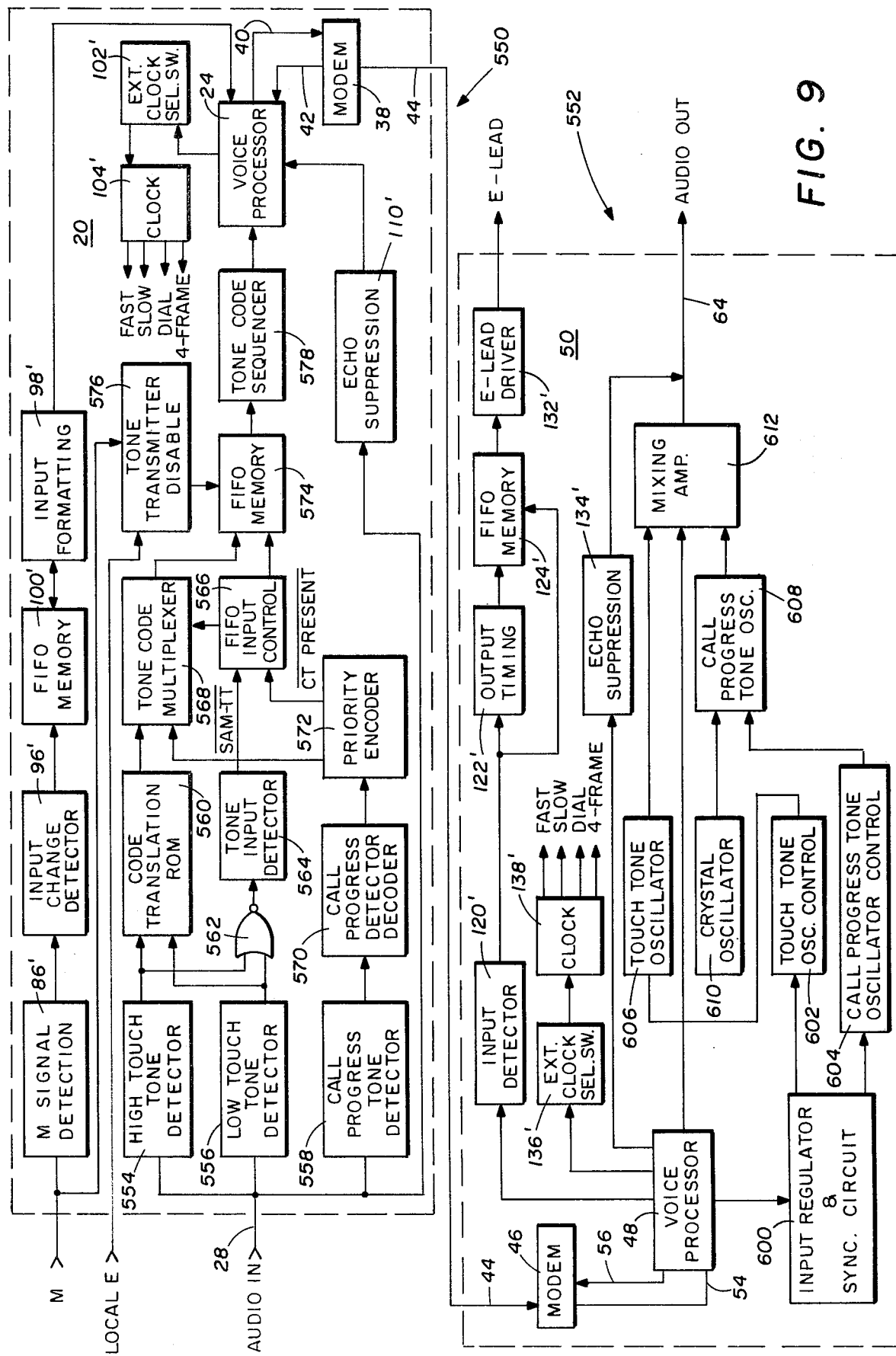
FIG. 9 is a detailed block diagram of the transmit and receive sections of the present signal processor for use with a telephone system utilizing TOUCH-TONE telephone signals.

FIG. 9 illustrates the block diagram of the present signal processor for use with a TOUCH-TONE telephone system wherein like numerals are utilized for like and corresponding elements previously identified. It will be understood that the present signal processor has capabilities for both receiving and processing rotary dial pulse signals as previously described, as well as TOUCH-TONE dialing signals. For convenience in illustration and description, signal processor 20 (FIG. 1) is illustrated in FIG. 9 as being a transmitting signal processor as part of a transmitter section 550 of the communications link. Similarly, signal processor 50 (FIG. 1) is illustrated in the receiving mode of operation as part of the receiver section 552 of the communications system.

Several of the functions in the TOUCH-TONE signal processors 20 and 50 are similar to those functions performed in the signal processors 20 and 50 functioning to receive rotary dial pulse telephone signals. Specifically, the M telephone signal is applied to an M signal detection circuit 86' similar in configuration and operation to the input protection circuit 86. The output of M signal detection circuit 86' is applied to an input change detector 96' similar to the input change detector 96 previously described. The output of input change detector 96' is applied to a FIFO memory 100' which is interconnected to an input formatting circuit 98' for application of digitized E and M signalling to voice processor 24.

Voice processor 24 also is interconnected to an external clock select switch 102' whose output is applied to clock circuitry 104', which generates the FAST, SLOW, DIAL and 4-FRAME clocking signals as previously described in connection with FIGS. 2 and 6. A further similarity between the transmit section 550 and the transmit section 80 (FIG. 2) is the echo suppression circuitry 110', which has been previously described in connection with FIG. 7.

The receive section 552 contains circuitry similar to that which has been described with respect to the receive section 82 of the signal processor 50 shown in block diagram form in FIG. 2. Particularly, the circuitry and function of input detector 120' corresponds to input detector 120 of FIG. 2 for detecting E and M signalling. The output of input detector 120' is applied to output timing circuitry 122' which performs a function similar to the dialer disable circuitry 122 and counter 126 of FIG. 2 for applying digital E and M signalling to FIFO memory 124'. The output of FIFO memory 124' is applied to E lead driver 132' which functions in a manner similar to E lead driver 132 of signal processor 50 (FIG. 2). A further similarity in the receiver section 552 is the echo suppression circuit 134' which functions in a manner similar to echo suppression circuitry 134 of the receiver section 82 of signal processor 50 (FIG. 2).

TOUCH-TONE dialing signals generated at a telephone terminal such as terminal 26 (FIG. 1) are composed of a dual tone frequency. These dual tone frequencies are composed of frequencies of a low group and of a high group. The low group frequencies comprise 697 Hz, 770 Hz, 852 Hz and 941 Hz. The high group frequencies comprise 1209 Hz, 1336 Hz, 1477 Hz and 1633 Hz. These frequencies are arranged in a matrix to generate TOUCH-TONE dialing signals corresponding to specific numerals and symbols. Table 1 is a representation of the dual tone frequency matrix corresponding to a standard push-button TOUCH-TONE pad. For example, the TOUCH-TONE corresponding to the numeral 7 is composed of low group frequency 852 Hz and high group frequency 1209 Hz.

TABLE 1

| Frequency Allocation of Digits and Symbols | | | | | |
|---|---|---|---|---|---|
| | | High Group Frequencies (Hz) | | | |
| | | 1209 | 1336 | 1477 | 1633 |
| Low | 697 | 1 | 2 | 3 | A |
| Group | 770 | 4 | 5 | 6 | B |
| Frequencies | 852 | 7 | 8 | 9 | C |
| (Hz) | 941 | * | 0 | # | D |

A second type of TOUCH-TONE dialing signals which the signal processor of the present invention encodes into a digital format and decodes for use by a receiving telephone system comprise call progress tones. Call progress tones supply information to the telephone user and include the tones identified in Table 2. Although these call progress tones are discussed in connection with the TOUCH-TONE portion of the signal processor of the present invention, this aspect of the present invention is also utilized with the rotary dial pulse telephone system previously described.

TABLE 2

| Call Progress Tone Identification | |
|---|---|
| Dial Tone (DT) | 350 Hz and 440 Hz, steady dial tone. |
| Recall Dial Tone (RDT) | 350 Hz and 440 Hz, at 300 interrup- |

TABLE 2-continued
Call Progress Tone Identification

| | |
|---|---|
| | tions per minute for 3 bursts, then steady dial tone. |
| Miscellaneous Tone (MT) | 440 Hz, steady dial tone. |
| Intercept Tone (IT) | 620 Hz on for 0.2 sec., and 440 Hz on for 0.2 sec. |
| Reorder Tone (RT) | 480 Hz and 620 Hz on 0.3 sec. and off 0.2 sec. |
| Busy Tone (BT) | 480 Hz and 620 Hz at 60 interruptions per minute. |
| Audible Ring Back Tone (ART) | 440 Hz and 480 Hz on 0.8 sec. and off 3.2 sec. |
| Special Audible Ring Back Tone (SART) | 440 Hz and 480 Hz on 0.8 sec., followed by 440 Hz on 0.2 sec. and off for 3 sec. |

The audio signal from telephone system 22 including TOUCH-TONE dialing signals and call progress tone signals is applied to signal processor 20 over audio signal line 28 to a high TOUCH-TONE detector 554, a low TOUCH-TONE detector 556 and a call progress tone detector 558. The output of high TOUCH-TONE detector 554 and low TOUCH-TONE detector 556 is applied to a code translation read only memory 560. The output of high TOUCH-TONE detector 554 and low TOUCH-TONE detector 556 is also applied through a NOR gate 562 to a tone input detector 564. Tone input detector 564 generates the SAM-TT-signal for application to the FIFO input control circuitry 566. The output of tone input detector 564 indicates that a valid tone is present at the output of code translation ROM and that this tone should be applied and sampled by a tone code multiplexer 568.

The output of call progress tone detector 558 is applied to a call progress detector decoder 570, which determines which of the frequencies comprising a call progress tone are present. The output of call progress detector decoder 570 is applied to a priority encoder 572 which produces a 3-bit word corresponding to a specific call progress tone. The output of priority encoder 572 is applied to the tone code multiplexer 568.

The tone code multiplexer 568, therefore, receives TOUCH-TONE codes from the code translation read only memory 560 and call progress tone codes from priority encoder 572. Tone code multiplexer 568 is controlled by the output of FIFO input control 566 when the CT present signal is applied from priority encoder 572 to FIFO input control 566. The output of tone code multiplexer 568 is applied to FIFO memory circuits 574. Tone transmitter disable circuitry 576 receives the E and M signalling from telephone system 22 (FIG. 1). Tone transmitter disable circuitry 576 functions to disable the input to FIFO memory circuits 574 to thereby prevent false information from being clocked into FIFO memory circuits 574 and functions to disconnect the audio channel of the voice processor 24 when tone codes are being processed.

The output of FIFO memory circuits 574 is applied to voice processor 24 under the control of a tone code sequencer circuit 578. The output of tone code sequencer circuit 578 represents digital representations of the TOUCH-TONE dialing signals and call progress tone signals previously input to signal processor 20 (FIG. 1) from the telephone terminal 26 through telephone system 22. The bit definitions for the TOUCH-TONE and call progress tone digital codes are tabulated in Table 3.

TABLE 3
Bit Definitions for Touch-Tones and Call Progress Tones

| Touch-Tone/Call Progress Tone | Bit Definitions |
|---|---|
| 1 | 10000 |
| 2 | 10010 |
| 3 | 10001 |
| 4 | 11000 |
| 5 | 11010 |
| 6 | 11001 |
| 7 | 10100 |
| 8 | 10110 |
| 9 | 10101 |
| 0 | 11110 |
| * | 11100 |
| # | 11101 |
| A | 10011 |
| B | 11011 |
| C | 10111 |
| D | 11111 |
| DT | 01001 |
| RDT | 01000 |
| MT | 01111 |
| IT | 01010 |
| RT | 01011 |
| BT | 01100 |
| ART | 01110 |
| SART | 01101 |

The digital representations of the TOUCH-TONE dialing signals and call progress tone signals are applied via data link 44 to modem 46. The output of modem 46 is applied via digital signal line 56 to voice processor 48 of the receive section 552 of signal processor 50. The output of voice processor 48 is applied to an input regulator and synchronization circuit 600 whose output is applied to TOUCH-TONE oscillator control circuitry 602 and call progress tone oscillator control circuitry 604. The output of TOUCH-TONE oscillator control 602 is applied to TOUCH-TONE oscillator 606, and the output of call progress tone oscillator control 604 is applied to call progress tone oscillator 608. TOUCH-TONE oscillator 606 and call progress tone oscillator 608 generate tones corresponding to the digital representations of the TOUCH-TONE dialing signals or call progress tone signals encoded and transmitted by signal processor 20 of the transmit section 550 of the communications system. Call progress tone oscillator 608 also has an input from a crystal oscillator 610. The output of TOUCH-TONE oscillator 606 and call progress tone oscillator 608 together with the output of voice processor 48 representing speech signals are applied to a mixing amplifier 612. Mixing amplifier 612 combines the voice signal, TOUCH-TONE dialing signals and call progress tone signals for output to the telephone system 52 via audio signalling lines 64 for application to telephone terminal 68 (FIG. 1).

Touch-Tone System Schematic Diagrams

Figure 10:
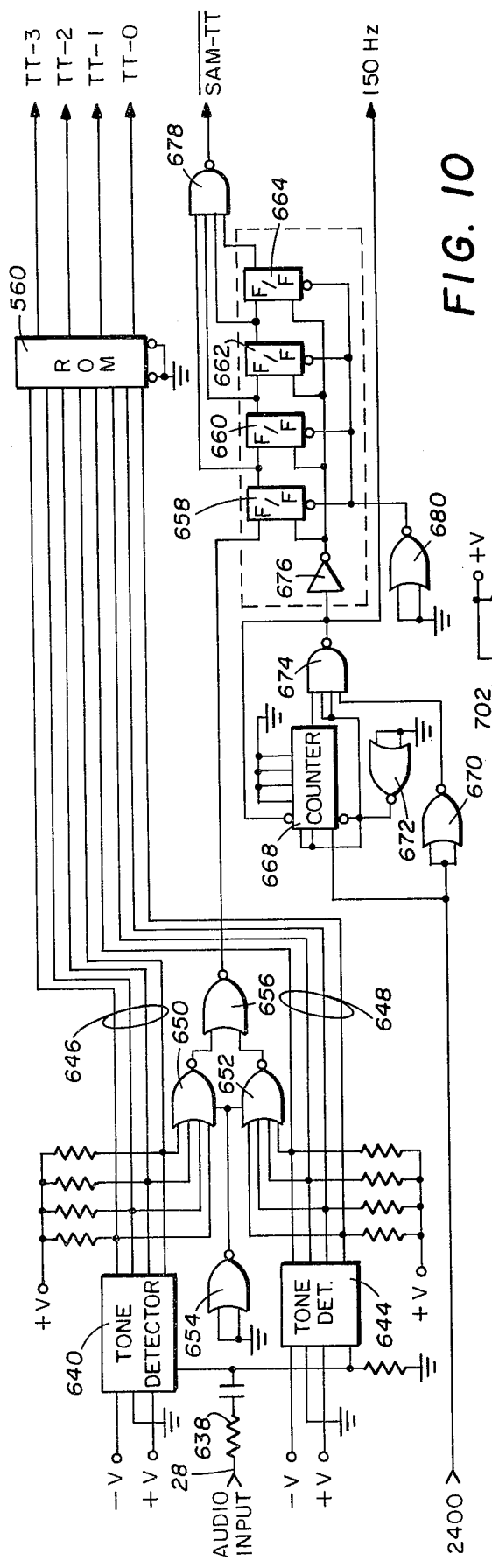
FIG. 10 is a detailed schematic diagram of a portion of the transmit section of the present signal processor including the high and low TOUCH-TONE detectors, code translation read only memory and tone input detector shown in block diagram form in FIG. 9.

FIG. 10 illustrates in schematic detail the high TOUCH-TONE detector circuitry 554, low TOUCH-TONE detector circuitry 556, code translation read only memory 560 and tone input detector 564 shown in block diagram form in FIG. 9. The audio input signal from telephone system 22 is applied via audio signalling lines 28 (FIG. 1) through a filter 638 to tone detectors 640 and 644. Tone detectors 640 and 644 may comprise, for example, Model Series Number 550 tone detectors manufactured and sold by Frequency Devices, Inc., of Haverhill, Mass. Each dual tone frequency comprises whether a TOUCH-TONE signal or a call progress tone signal will contain a high or a low tone. Tone detector 640 will detect the high TOUCH-TONEs comprising tones having a frequency of 1633 Hz, 1477 Hz, 1336 Hz and 1209 Hz. Tone detector 644 will detect the low TOUCH-TONE signals, comprising tones having a frequency of 941 Hz, 852 Hz, 770 Hz and 697 Hz. The high detected TOUCH-TONEs are applied to code translation ROM 560 via signal lines 646. The low detected tones are applied from tone detector 644 via signal lines 648 to code translation ROM 560. Code translation ROM 560 is a 256-bit read only memory and may comprise, for example, an HM7611 I/C. The output of ROM 560 produces a 4-bit code identified as signals TT-0, TT-1, TT-2 and TT-3, which corresponds to the particular frequency of the TOUCH-TONE signal applied to signal processor 20 via audio signalling lines 28 (FIG. 1).

FIG. 10 also illustrates the tone input detector 564 illustrated in block diagram form in FIG. 9. The output of tone detector 640 is applied via signalling lines 646 to a NOR gate 650. The output of the tone detector 644 is applied via signalling line 648 to a NOR gate 652. NOR gates 650 and 652 also receive an input from NOR gate 654. The outputs of NOR gates 650 and 652 are applied through a NOR gate 656 to flip-flops 658, 660, 662 and 664. Flip-flops 658, 660, 662 and 664 comprise a hex-/quad D flip-flop and may comprise, for example, a 74175 I/C. The 2400 bit per second clocking signal is applied to a counter 668 and a NOR gate 670. Counter 668 is a 4-bit binary counter and may comprise, for example, a 93L16 I/C. Counter 668 also receives an input from NOR gate 672. The output of counter 668 together with the output of NOR gate 670 are applied to NAND gate 674. The output of NAND gate 674 generates a 150 Hz signal for use as a clock signal. The output of NAND gate 674 is also applied through an inverter 676 to flip-flops 658, 660, 662 and 664 whose outputs are applied to a NAND gate 678 to generate the SAM-TT-signal. Flip-flops 658, 660, 662 and 664 further receive an input signal from a NOR gate 680. The generation of the SAM-TT-signal indicates that a valid signal is present at the output of ROM 560 and that this signal should be sampled.

Figure 11:
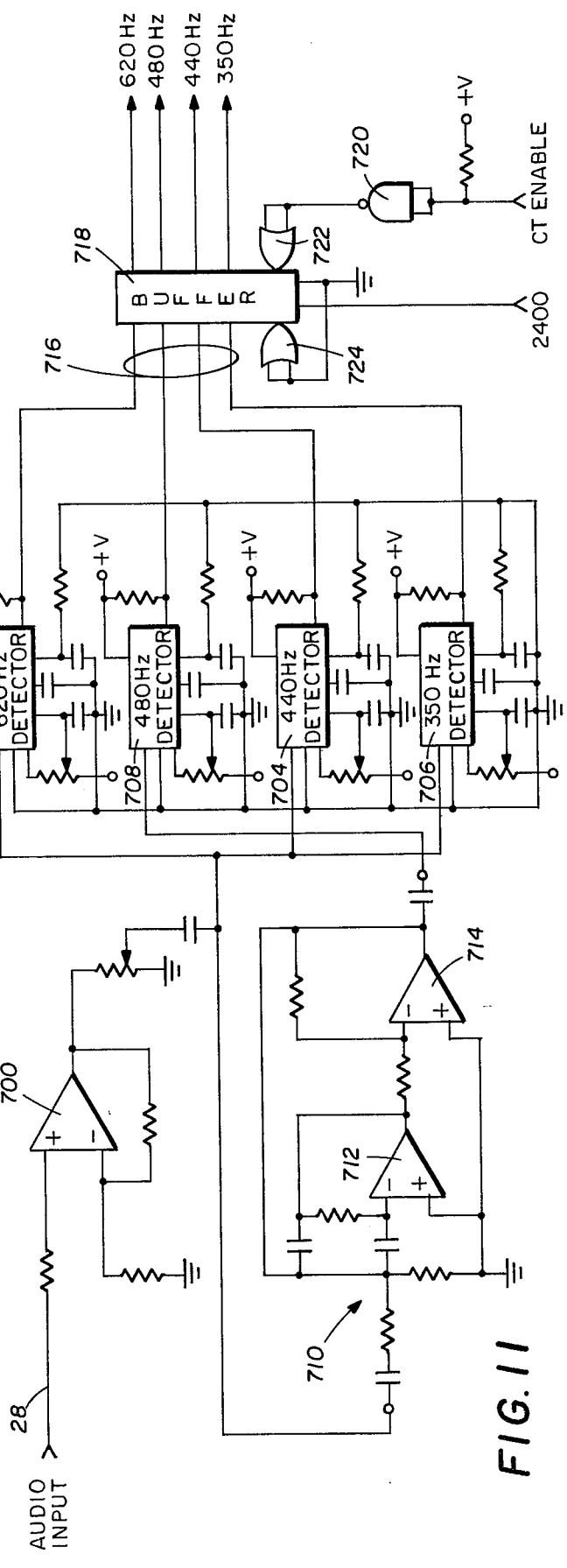
FIG. 11 is a detailed schematic diagram of a portion of the transmit section of the present signal processor including the call progress tone detector shown in block diagram form in FIG. 9.

FIG. 11 illustrates in schematic detail the call progress tone detector 558 illustrated in block diagram form in FIG. 9. The audio input signal containing call progress tones is applied via audio signalling lines 28 to a buffer amplifier 700. Buffer amplifier 700 may comprise, for example, a 747 I/C. The output of buffer amplifier 700 is applied to tone detectors 702, 704 and 706, which detect tones having frequencies of 620 Hz, 440 Hz and 350 Hz. To eliminate the generation of an undesirable beat frequency when the 480 Hz and 440 Hz tones are present, such as the audible ring back tone, tones having a frequency of 480 Hz are applied to a detector 708 through a narrow band-pass filter generally identified by the numeral 710. Band-pass filter 710 includes buffer amplifiers 712 and 714 and their associated resistors and capacitors. Amplifiers 712 and 714 may comprise, for example, 747 I/Cs. The outputs of detectors 702, 704, 706 and 708 are applied via signalling lines 716 to a buffer 718. Buffer 718 is a TRI-STATE, 4-bit D-type register and may comprise, for example, a DM85L51 I/C. Buffer 718 is clocked by the 2400 Hz clocking signal and receives the CT ENABLE signal through a NAND gate 720 and OR gate 722. Buffer 718 also receives an input from an OR gate 724. The output of buffer 718 represents the presence of tones having frequencies of 620 Hz, 480 Hz, 440 Hz and 350 Hz used to generate the call progress tones.

Figure 12:
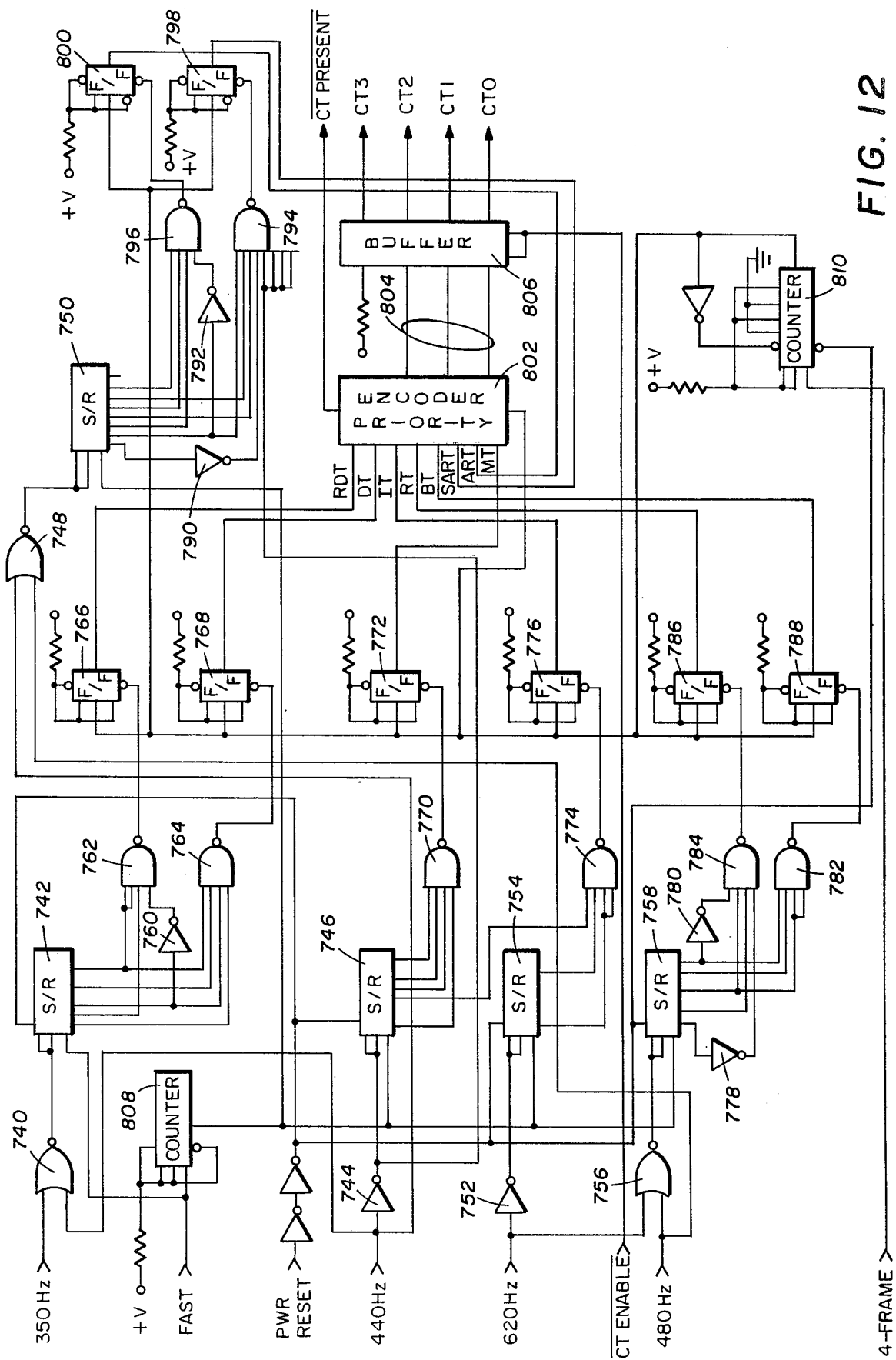
FIG. 12 is a detailed schematic diagram of a portion of the transmit section of the present signal processor including the call progress detector decoder and priority encoder shown in block diagram form in FIG. 9.

FIG. 12 illustrates in schematic detail the call progress detector decoder circuitry 570 and the priority encoder 572 shown in block diagram form in FIG. 9. The 350 Hz tone generated at the output of buffer 718 (FIG. 11) is applied through NOR gate 740 to a shift register 742. The 440 Hz tone generated at the output of buffer 718 (FIG. 11) is also applied to shift register 742 through NOR gate 740. The 440 Hz tone is also applied through the inverter 744 to a shift register 746, and is further applied through a NOR gate 748 to a shift register 750. The 620 Hz tone generated at the output of buffer 718 (FIG. 11) is applied through an inverter 752 to a shift register 754, and is applied through a NOR gate 756 to a shift register 758. The 480 Hz tone generated at the output of buffer 718 (FIG. 11) is applied through a NOR gate 756 to a shift register 758 and through NOR gate 748 to shift register 750. Shift registers 742, 746, 754, 758 and 750 are 8-bit serial in/parallel out shift registers and may comprise, for example, DM74164 I/Cs.

The output of shift register 742 is applied through an inverter 760 and NAND gates 762 and 764 to flip-flops 766 and 768. The output of flip-flop 766 generates the RDT call progress tone composed of the 350 Hz and 440 Hz tones which were gated through NOR gate 740. The output of flip-flop 768 generates the DT call progress tone which also is a combination of the 350 Hz and 440 Hz tones. The timing characteristics of call progress tones RDT and DT are controlled by shift register 742 and flip-flops 766 and 768 to control the length and burst duration of the RDT and DT call progress tones.

The output of shift register 746 is applied through a NAND gate 770 to a flip-flop 772 to generate the MT call progress tone. The output of shift register 754 is applied through a NAND gate 774 to a flip-flop 776 to generate the IT call progress tone.

The output of shift register 758 is applied through inverters 778 and 780 and NAND gates 782 and 784 to flip-flops 786 and 788. The output of flip-flop 786 generates the RT call progress tone which is composed of the 430 Hz and 620 Hz tones. The output of flip-flop 788 generates the BT call progress tone which is also composed of the 480 Hz and 620 Hz tones. The RT and BT call progress tones are both composed of tones having frequencies of 480 Hz and 620 Hz which are combined by NOR gate 756 for application to shift register 758. Shift register 758 and its related circuitry generate the timing characteristics of the RT and BT call progress tones relating to the burst duration and time intervals between bursts.

The output of shift register 750 is applied through inverters 790 and 792 to NAND gates 794 and 796. The outputs of NAND gates 794 and 796 are applied to flip-flops 798 and 800. Flip-flop 798 generates the SART call progress tone, and flip-flop 800 generates the ART call progress tone. The SART and ART call progress tones are composed of the 440 Hz and 480 Hz tones which are applied to shift register 750 through NOR gate 748. The timing characteristics of the ART and SART call progress tones are determined by shift register 750 and related circuit components.

The eight generated call progress tones are applied to a priority encoder 802. Priority encoder 802 encodes eight data lines to 3-line binary data and may comprise, for example, a DM74148 I/C. The output of priority encoder 802 is applied along signal lines 804 to a buffer 806. Buffer 806 is a TRI-STATE hex buffer and may comprise, for example, a DM8097 I/C. The output of buffer 806 produces the call progress tone code signals CT0, CT1, CT2 and CT3. The output of priority encoder 802 also generates the CT-signal.

In order to generate the specific timing characteristics of the call progress tones, the FAST and 4-FRAME clocking signals are applied through counters 808 and 810 to apply clocking signals to shift registers 742, 746, 754, 758 and 750. Counters 808 and 810 are synchronous 4-bit counters and may comprise, for example, 9316 I/Cs.

Figure 13:
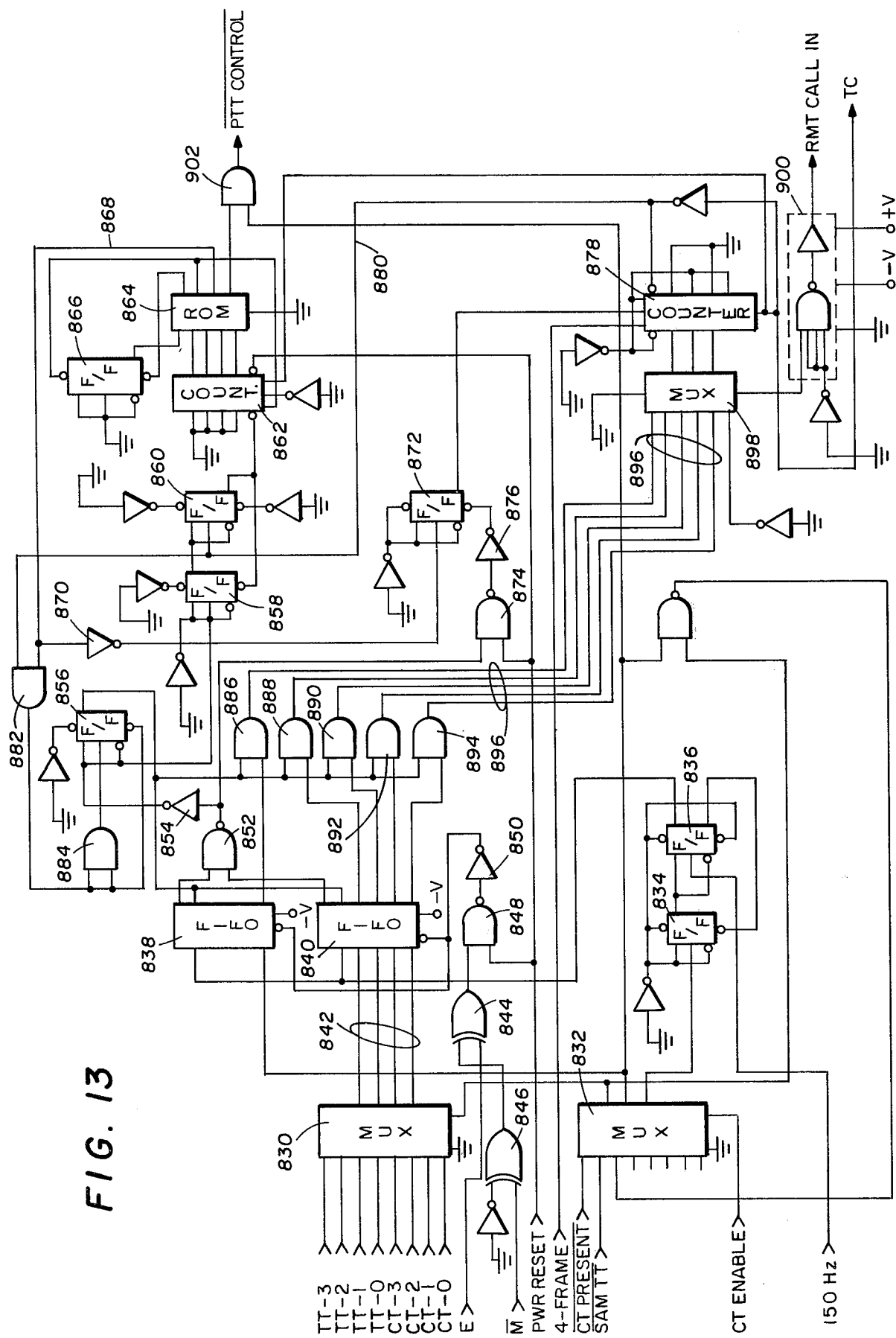
FIG. 13 is a detailed schematic diagram of a portion of the transmit section of the present signal processor including the tone code multiplexer, memory, tone transmitter disable and tone code sequencer shown in block diagram form in FIG. 9.

FIG. 13 illustrates in schematic detail the FIFO input control 566, FIFO memory circuits 574, tone transmitter disable circuitry 576 and the tone code sequencer circuitry 578 represented in block diagram form in FIG. 9. TOUCH-TONE code words TT-0, TT-1, TT-2 and TT-3 generated at the output of ROM 560 (FIG. 10) and the call progress code words CT-0, CT-1, CT-2 and CT-3 generated at the output of buffer 806 (FIG. 12) are applied to a multiplexer 830. The CT PRESENT-signal, SAM-TT-signal and the CT ENABLE signal are applied to a multiplexer 832. Multiplexers 830 and 832 are quad 2-line to 1-line data selector/multiplexers and may comprise, for example, 93L22 I/Cs. The output of multiplexer 832 is supplied to flip-flops 834 and 836. The output of flip-flop 836 is applied to FIFO registers 838 and 840. FIFOs 840 and 838 may comprise, for example, 3341 I/Cs. Whenever the SAM TT-signal goes low, as applied to multiplexer 832, an output is generated by multiplexer 832 to flip-flops 834 and 836. Flip-flops 834 and 836 generate a clocking signal to FIFO 840 to cause one TOUCH-TONE code word from multiplexer 830 to be input into FIFO 840 via signal lines 842. Whenever the CT PRESENT-signal is at a low state, multiplexer 832 generates an output to flip-flops 834 and 836. Flip-flops 834 and 836 then cause a call progress code word to be output from multiplexer 830 via signal lines 842 to FIFO 840.

The E lead signal and M- lead signal are applied to an exclusive OR gate 844 and an exclusive OR gate 846. The output of exclusive OR gate 846 is applied to exclusive OR gate 844, which generates an output to a NAND gate 848 for application through an inverter 850 to FIFOs 838 and 840. The output of inverter 850 causes the input to FIFOs 838 and 840 to be disabled to prevent false information from being clocked into FIFOs 838 and 840 when the complete communications link has been established. Exclusive OR gates 846 and 844, together with NAND gate 848 and inverter 850 comprise the tone transmit disable circuitry 576 shown in block diagram form in FIG. 9.

After the first word, either a TOUCH-TONE code word or a call progress code word, is loaded into FIFO 840, the word appears at the output ready line of each FIFO 838 and 840 and will be applied to a NAND gate 852 through an inverter 854 to flip-flops 856, 858 and 860. The clocking of flip-flops 858 and 860 initiates a sequence which initially loads a counter 862 interconnected to flip-flops 858 and 860. Counter 862 is a 4-bit binary counter and may comprise, for example, a 93L16 I/C. The output of counter 862 is applied to a read only memory 864, which receives a different starting address whenever counter 862 is loaded. Read only memory 864 may comprise, for example, an HM7603 I/C. ROM 864 is also interconnected to a flip-flop 866.

The new starting address applied to ROM 864 generates an output along signal line 868 through an inverter 870 to a flip-flop 872. Flip-flop 872 also receives the output of NAND gate 852 through a NAND gate 874 and an inverter 876. The output of flip-flop 872 is applied to a counter 878. Counter 878 is a 4-bit binary counter and may comprise, for example, a 93L16 I/C. The output of counter 878 is applied along signal line 880 to an AND gate 882, which also receives an output along signal line 868 from ROM 864. The output of AND gate 882 is applied to an AND gate 884, whose output is applied to flip-flop 856. The outputs of counter 878 and ROM 864 cause flip-flop 856 to generate three synchronization pulses to begin the sequencing cycle of outputting data from FIFOs 838 and 840. Counter 878 is clocked by the 4-FRAME clock pulse such that counter 878 will count every six pulses. Counter 878 generates one sync pulse and five word pulses. After the three synchronization pulses have been generated, ROM 864 causes flip-flop 856 to gate the data that is present at the output ready lines of FIFOs 838 and 840 to be gated through AND gates 886, 888, 890, 892 and 894. The output of AND gates 886, 888, 890, 892 and 894 is applied along signal lines 896 to a multiplexer 898. Multiplexer 898 is a data selector/multiplexer and many comprise, for example, a 74151 I/C. Multiplexer 898 under the control of counter 878, after the three synchronization pulses have been received, selects the outputs of FIFOs 838 and 840 in sequence and generates a serial bit stream to be generated for application to the voice processor 24 (FIG. 9) through a line driver 900. The output of line driver 900 represents digital representations of the TOUCH-TONE dialing signals and the call progress tone signals, which have previously been detected and encoded into code words at the output of ROM 560 (FIG. 10) and the output of buffer 806 (FIG. 12).

Whenever the output ready lines of FIFOs 838 and 840 are low indicating that the registers are empty, counter 878 is not restarted. Each time FIFOs 838 and 840 are full, such that the output ready lines go high, the flip-flops 858 and 860 will cause counter 862 to reset and therefore restart the control cycle. If the control cycle is not restarted, the cycle is allowed to time out, which generates three more synchronization pulses after the final code word has been applied to multiplexer 898. Whenever synchronization pulses are being generated, either before data is output from FIFOs 838 and 840 or after the last code word is output from FIFOs 838 and 840, the outputs of AND gates 886, 888, 890, 892 and 894 cut off and cause all zeros to be introduced as the data word. After the last three synchronization pulses have been generated after the final word, the output of line driver 900 to voice processor 24 is held at a steady level.

The 150 Hz signal generated at the output of counter 668 (FIG. 10) is applied to flip-flop 836. As previously stated, flip-flop 836 causes a code word which is present at the output of multiplexer 830 to be clocked into FIFOs 838 and 840. The PTT CONTROL-output signal is generated by AND gate 902, which receives an input from multiplexer 832 and read only memory 864.

Figure 14:
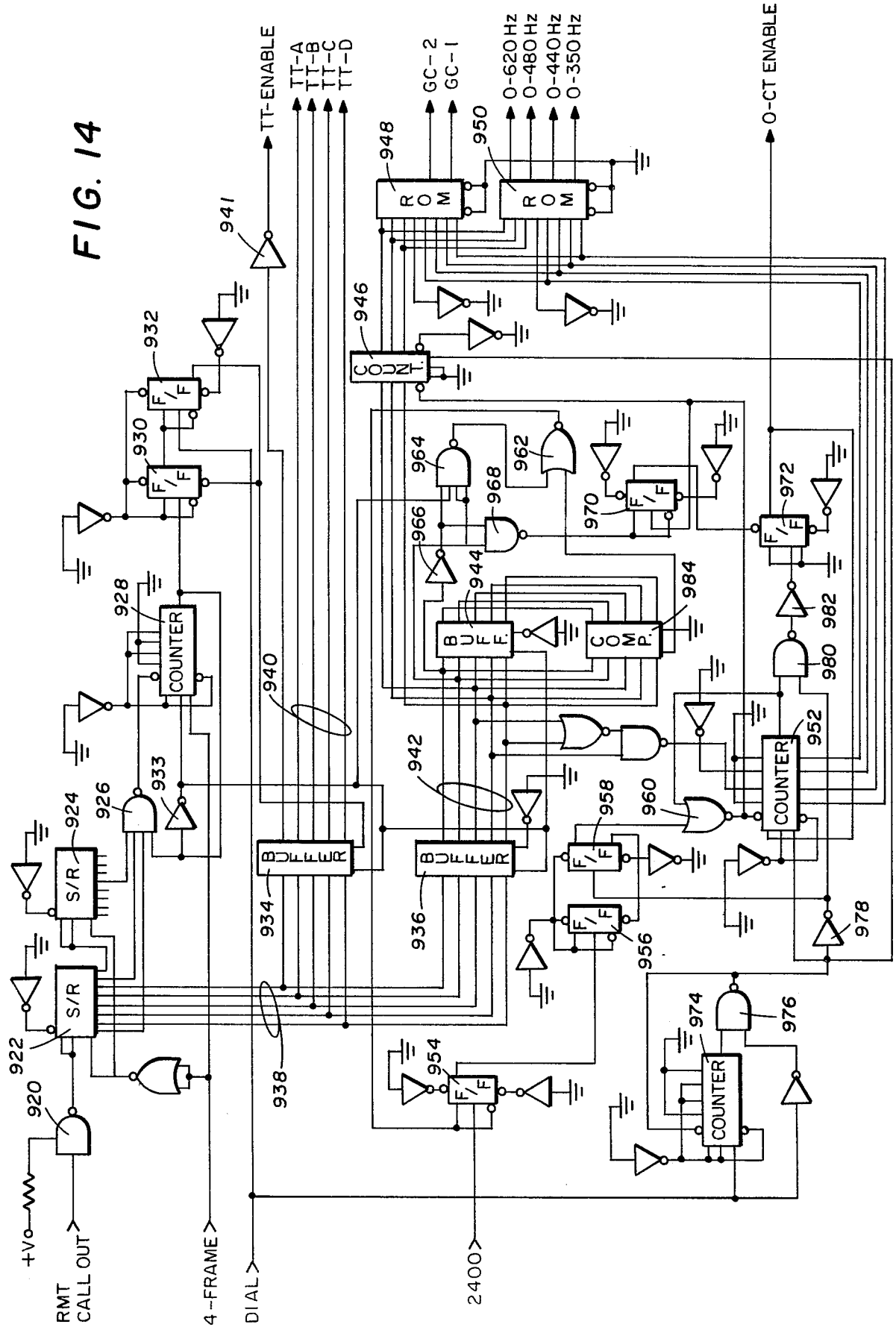
FIG. 14 is a detailed schematic diagram of a portion of the receive section of the present signal processor including the TOUCH-TONE oscillator control, input regulator and synchronization circuit and call progress tone oscillator control shown in block diagram in FIG. 9.

FIG. 14 illustrates in schematic detail the input regulator and synchronization circuit 600, call progress tone oscillator control 604 and TOUCH-TONE oscillator control 602 of the receive section 552 of signal processor 50 illustrated in block diagram form in FIG. 9. The remote call output signal of voice processor 48 is applied through a NAND gate 920 to shift registers 922 and 924. Shift registers 922 and 924 are 8-bit serial in-/parallel out shift registers and may comprise, for example, DM74164 I/Cs. Outputs of shift registers 922 and 924 are applied to a NAND gate 926, whose output is applied to a counter 928. Counter 928 is a 4-bit counter and may comprise, for example, a 9316 I/C. Counter 928 will be loaded each time a synchronization pulse is received by shift registers 922 and 924. Counter 928 will count to six counts and will continue to count if all ones are received. After three synchronization pulses are detected by counter 928, its output is applied to flip-flops 930 and 932.

At the same time counter 928 is counting, counter 928 through inverter 933 clocks buffers 934 and 936. Buffers 934 and 936 are hex/quad D flip-flops with clear and may comprise, for example, 74174 I/Cs.

Buffers 934 and 936 also receive at an output from shift register 922 along signal lines 938. Buffer 934 functions as the TOUCH-TONE control buffer and applies its output along signal lines 940 to generate the TT-A, TT-B, TT-C and TT-D output signals for application to the TOUCH-TONE oscillator 606 (FIG. 9). Buffer 934 uses the most significant bits of the TOUCH-TONE code word to control the TOUCH-TONE oscillator 606 as its codes compose the upper half of the TOUCH-TONE code word. When the last three synchronization pulses are detected by counter 928, flip-flops 930 and 932 generate an output to buffer 934 to clear buffer 934 thereby producing an all zeros output along signal lines 940 to turn off the TOUCH-TONE oscillator 606 (FIG. 9). Buffer 934 generates the TT-ENABLE output signal through an inverter 941.

Buffer 936 is the call progress tone code control buffer and applies its output along signal lines 942 to a buffer 944 and a counter 946. Buffer 944 is a hex/quad D flip-flop with clear and may comprise, for example, a 74174 I/C. Counter 946 is a 4-bit counter and may comprise, for example, a 93L16 I/C. The output of counter 946 is applied to read only memories 948 and 950. Read only memory 948 functions as a gain control ROM and may comprise, for example, a 7611 I/C. The output of ROM 948 generates the GC-1 and GC-2 output signals for application to the TOUCH-TONE oscillator 606. Read only memory 950 functions as a sequencing control ROM and may comprise, for example, a 7611 I/C. The output of read only memory 950 generates the 0-620 Hz, 0-480 Hz, 0-440 Hz and 0-350 Hz output signals for application to the call progress tone oscillator 608 (FIG. 9). Whenever one of the output lines of read only memory 950 goes high, call progress tone oscillator 608 generates the corresponding tone. When a combination of tones is required to generate a call progress tone more than one output line of ROM 950 will go high, such as when a dial tone is present the 0-440 Hz and 0-350 Hz output lines will go high.

The proper timing intervals for the call progress tone signals and TOUCH-TONE signals are controlled by a counter 952, whose output is applied to ROM 948 and ROM 950. The 2400 clock signal is applied through flip-flops 954, 956, and 958 to a NOR gate 960 to provide an input to counter 952. Flip-flop 954 also receives as an input the output of a NOR gate 962. NOR gate 962 has an input supplied by NAND gate 964, which receives an input from inverters 933 and 966 from buffer 936. The outputs of buffer 936 and inverter 966 are also applied to a NAND gate 968, whose output is applied to a flip-flop 970. The output of flip-flop 970 is applied to a flip-flop 972.

The DIAL clocking signal is applied to a counter 974. Counter 974 is a 4-bit counter and may comprise, for example, a 93L16 I/C. The output of counter 974 is applied to a NAND gate 976, whose output is applied through an inverter 978 to a NAND gate 980. The output of NAND gate 980 is applied through an inverter 982 to flip-flop 972 to generate the 0-CT ENABLE output signal.

The output of buffer 936 along signal lines 942 is also applied to a comparator 984. Comparator 984 is a 4-bit comparator and may comprise, for example, a 93L24 I/C. Comparator 984 functions to indicate that a different code has been output from buffer 936 and that a new value is to be loaded into the counter 946.

Figure 15:
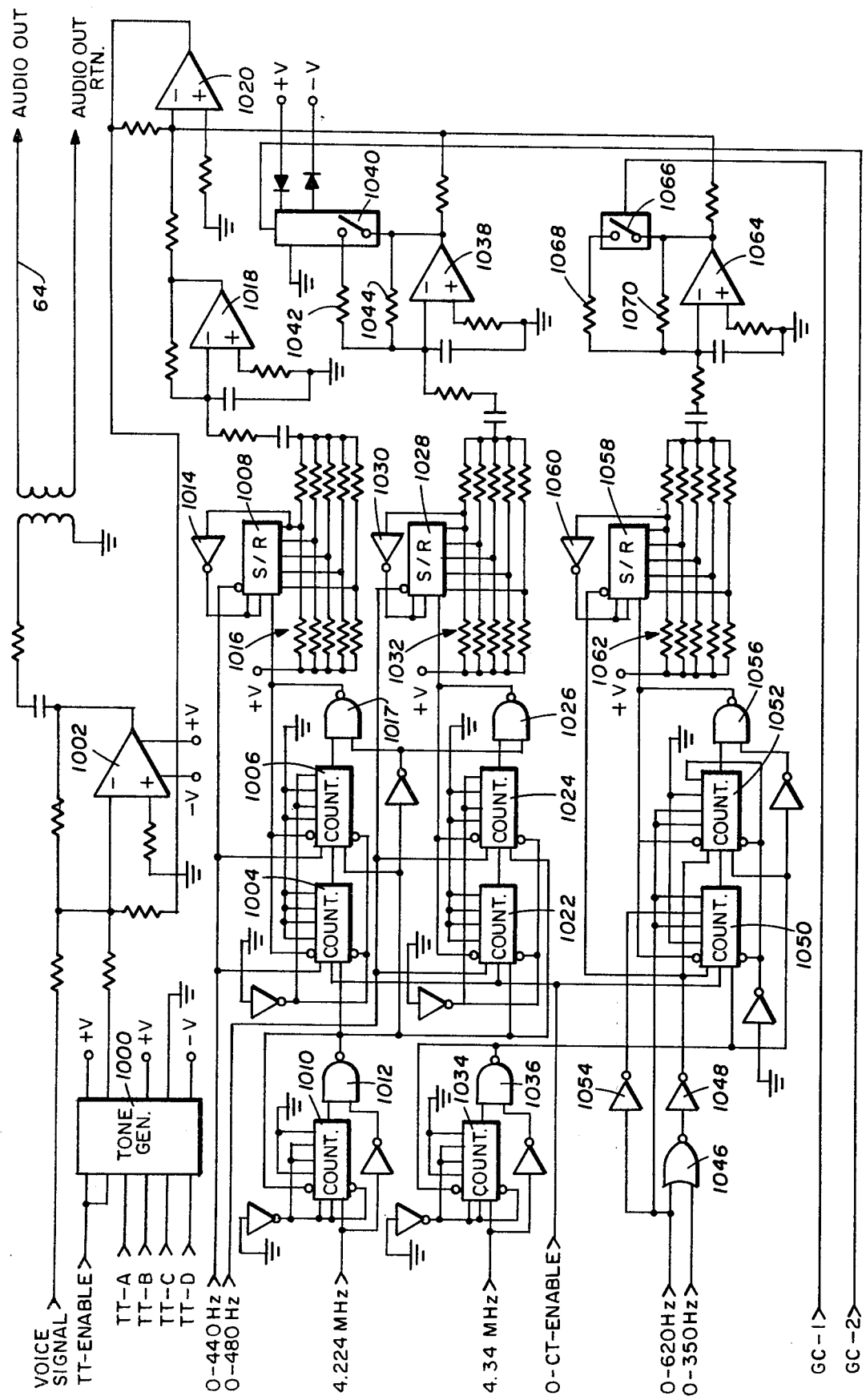
FIG. 15 is a detailed schematic diagram of a portion of the receive section of the present signal processor including the TOUCH-TONE oscillator, call progress tone oscillator and mixing amplifier shown in block diagram form in FIG. 9.

FIG. 15 illustrates in schematic detail the TOUCH-TONE oscillator 606, call progress tone oscillator 608 and mixing amplifier 612 shown in block diagram form in FIG. 9. The TT-ENABLE, TT-A, TT-B, TT-C, and TT-D signals generated at the output of buffer 934 (FIG. 14) are applied to a tone generator 1000. Tone generator 1000 functions to generate the TOUCH-TONE frequencies corresponding to the TOUCH-TONEs detected by the TOUCH-TONE oscillator control circuitry 602 (FIG. 9). The generated TOUCH-TONEs by generator 1000 are applied to a mixing amplifier 1002. Mixing amplifier 1002 may comprise, for example, a 3403 I/C.

The 0-440 Hz tone code generated by ROM 950 (FIG. 14) is applied to counters 1004 and 1006, and a shift register 1008. Counters 1004 and 1006 are 4-bit counters and may comprise, for example, 93L16 I/Cs. Shift register 1008 is an 8-bit serial in/parallel out shift register and may comprise, for example, a 74164 I/C. A 4.224 MHz signal generated by crystal oscillator 610 (FIG. 9) is applied to a counter 1010 whose output is applied through a NAND gate 1012 to counter 1004. Counter 1010 is a 4-bit counter and may comprise, for example, a 93L16 I/C. The operation of counters 1004, 1006 and 1010 and shift register 1008 produces the call progress tone having a frequency of 440 Hz. The particular 440 Hz frequency is generated due to the particular tone code word 0-440 Hz applied to counters 1004 and 1006. Shift register 1008 is initially cleared to produce all zeros. The last bit of the 5-bit pattern applied to shift register 1008 is inverted using inverter 1014 and is applied to the input of shift register 1008 to generate a circulating bit pattern. This pattern circulates until the five bits are all ones. A resistor network 1016 at the output of shift register 1008 generates a sine wave as the data of shift register 1008 is shifted out under the control of counters 1004 and 1006 through a NAND gate 1017.

The output of shift register 1008 is applied to a buffer amplifier 1018 whose output is applied to a mixing amplifier 1020. Buffer amplifier 1018 and mixing amplifier 1020 may comprise, for example, 3403 I/Cs. Mixing amplifier 1020 functions to mix the outputs of the other call progress tone generators, to be subsequently described, and applies the mixed call progress tone signals to mixing amplifier 1002. Mixing amplifier 1002 in turn mixes the TOUCH-TONE signals with the call progress tone signals and applies its output to the voice signal generated by the voice processor 48 (FIG. 9). The resulting output of mixing amplifier 1002 is the audio out and audio out return signals on audio signal line 64 for application to the called telephone system 52 and the called telephone terminal 68 (FIG. 1) to complete the call initiated by the telephone terminal 26 (FIG. 1).

The 0–480 Hz call progress tone code generated at the output of ROM 950 (FIG. 14) is applied to counters 1022 and 1024. Counters 1022 and 1024 are 4-bit counters and may comprise, for example, 93L16 I/Cs. The output of counters 1022 and 1024 are applied through a NAND gate 1026 to a shift register 1028. Shift register 1028 is an 8-bit serial in/parallel out shift register and may comprise, for example, a 74164 I/C. Shift register 1028 in combination with an inverter 1030 and resistor network generally identified by the numeral 1032 generates a sine wave output corresponding to the call progress tone having a frequency of 480 Hz. A 4.34 MHz signal generated by crystal oscillator 610 (FIG. 9) is applied to a counter 1034. Counter 1034 is a 4-bit counter and may comprise, for example, a 93L16 I/C. The output of counter 1034 is applied to a NAND gate 1036, whose output is applied to counter 1022. Counters 1034, 1022 and 1024 together with shift register 1028 comprise the call progress tone oscillator for generating the 480 Hz call progress tone and operates in a similar manner to the call progress tone oscillator previously described for generating the 440 Hz call progress tone.

The output of shift register 1028 is applied to a buffer amplifier 1038. Buffer amplifier 1038 may comprise, for example, a 3403 I/C. The gain of buffer amplifier 1038 is controlled by a switch 1040 with interconnects one of two resistors 1042 or 1044 across amplifier 1038. The output of buffer amplifier 1038 is applied to mixing amplifier 1020 for application to the mixing amplifier 1002.

FIG. 15 also illustrates the remaining call progress tone oscillator for generating the 620 Hz and 350 Hz call progress tones. Since these two tones do not occur simultaneously in any of the eight call progress tones (Table 2), one tone oscillator is utilized to produce these two tones. The 0–620 Hz tone code is applied to a NOR gate 1046 whose output is applied through an inverter 1048 to counters 1050 and 1052. The 0–620 Hz tone code is also applied through an inverter 1054 to counter 1050. Counters 1050 and 1052 are 4-bit counters and may comprise, for example, 93L16 I/Cs. When present, the 0–350 Hz tone code generated at the output of ROM 950 (FIG. 14) is applied through NOR gate 1046 and inverter 1048 to counters 1050 and 1052. The output of counters 1050 and 1052 is applied through a NAND gate 1056 to a shift register 1058. Shift register 1058 in combination with an inverter 1060 and a resistor network generally identified by the numeral 1062 generates a sine wave corresponding to the 620 Hz or the 350 Hz call progress tones for application to a buffer amplifier 1064. Buffer amplifier 1064 may comprise, for example, a 3403 I/C. The gain of buffer amplifier 1064 is controlled by selecting through a switch 1066 one of two biasing resistors 1068 and 1070. The output of buffer amplifier 1064 is applied to mixing amplifier 1020 which functions to mix the call progress tones for application to mixing amplifier 1002.

The 0-CT ENABLE signal generated by flip-flop 972 (FIG. 14) is applied to each of the call progress tone oscillators, and is specifically applied to counters 1004, 1022 and 1050. The GC-1 and GC-2 signals generated by ROM 948 (FIG. 14) are applied to switch 1066 and switch 1040 to control the gain of buffer amplifiers 1064 and 1038.

Figure 16:
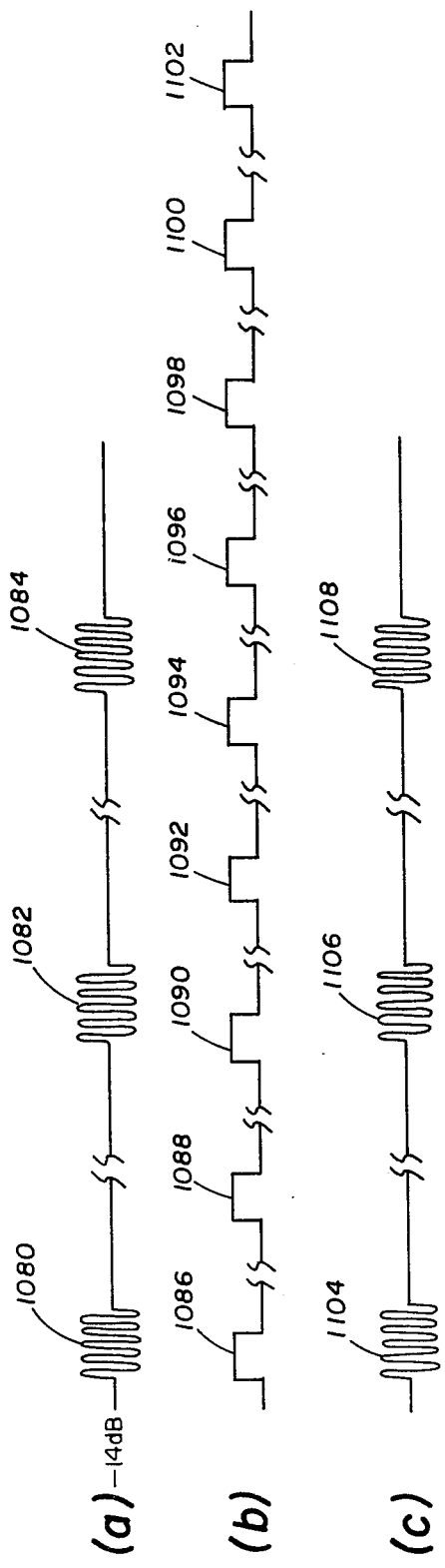
FIG. 16 is a representation of the TOUCH-TONE signals as processed by the present signal processor.

FIG. 16 illustrates the representations of the TOUCH-TONE dialing signals as processed by the present signal processor. FIG. 16(a) illustrates three dual-tone multifrequency tone bursts 1080, 1082 and 1084. Tone bursts 1080, 1082 and 1084 are 40 milliseconds in duration and are separated by a time interval of at least 40 milliseconds.

FIG. 16(b) illustrates the digital representation of the tone burst 1080 shown in FIG. 16(a). The first three pulses 1086, 1088 and 1090 represent the three synchronization pulses generated by the tone code sequencer 578 (FIG. 9). The synchronization pulses are 90 milliseconds in duration and are separated by a time interval of 0.45 second. The intervals between pulses 1092, 1094, 1096, 1098, 1100 and 1102 contain the 5-bit tone code words corresponding to the call progress tone codes and TOUCH-TONE codes generated by signal processor 20 (FIG. 1). The specific bit patterns for the tone code words are tabulated in FIG. 3. The bits 0–7 are undefined, bits 8–15 contain the bit patterns for the call progress tones and bits 16–31 contain the bit pattern for the dual tone multifrequency TOUCH-TONE signals. The waveforms illustrated in FIG. 16(b) are duplicated for each tone burst encoded by signal processor 20. Three synchronization pulses are generated after the last code word is transmitted.

FIG. 16(c) illustrates the decoded dual tone multifrequency signals for application to the telephone system 52 (FIG. 1). Tone bursts 1104, 1106 and 1108 have a duration 0.45 second and are separated by a time interval of 90 milliseconds.

It therefore can be seen that the present invention provides for a signal processor for use with a digital voice processor and a telephone communications system for digitizing telephone dialing signals including rotary dial pulse signals, TOUCH-TONE dialing signals and call progress tone signals for application to a voice processor. The present signal processor overcomes the limitations of existing voice digitizers that prevent accurate and complete telephone line interface signalling. Furthermore, the present signal processor has both the capability of digitizing rotary dial pulse signals as well as TOUCH-TONE dialing signals.

Whereas the present invention has been described with respect to specific embodiments thereof, it will be evident to those skilled in the art that numerous modifications and alterations are possible without departing from the spirit and scope of the invention as set forth in the appended claims.

What is claimed is:

1. A system for encoding telephone dialing signals received from a telephone system at a transmitting station, the encoded telephone dialing signals being transmitted using a digital format of a predetermined data transmission rate to a receiving station via telephone trunk lines for decoding and application to a telephone system interconnected to the telephone trunk lines at a receiving station, the telephone dialing signals having a predetermined data transmission rate other than the predetermined data transmission rate of the digital format, the system comprising:

means for receiving and storing rotary dial pulse telephone dialing signals received from the telephone system at the transmitting station for a predetermined time period;

time translation means for translating the predetermined data transmission rate of the rotary dial pulse telephone dialing signals to time translated rotary dial pulse telephone dialing signals at the predetermined data transmission rate of the digital format, such that the rotary dial pulse telephone dialing signals received from the telephone system at the transmitting station are transmitted to the receiving station in their original pulse form;

said time translation means including circuit means interconnected to said means for receiving and storing and to the telephone trunk lines at the transmitting station for selectively clocking said means for receiving and storing at the predetermined data transmission rate of the digital format to thereby cause said means for receiving and storing to convert stored rotary dial pulse telephone dialing signals stored in said means for receiving and storing to said time translated rotary dial pulse telephone, dialing signals for transmission to the receiving station;

means connected to the telephone trunk lines for receiving and storing said time translated rotary dial pulse telephone dialing signals from the transmitting station for a predetermined time period at the receiving station; and circuitry interconnected to said means for storing and receiving and the telephone system at the receiving station for selectively clocking said means for receiving and storing at the receiving station to thereby generate rotary dial pulse telphone dialing signals at the original data transmission rate generated by the telephone system at the transmitting station for application to the telephone system at the receiving station.

2. The system of claim 1 and further including:

circuitry interconnected to the telephone system at the transmitting station for receiving speech signals generated by the telephone system;

means for encoding said received speech signals to generate digital representations of said speech signals for transmission to the receiving station;

circuitry interconnected to the telephone system at the receiving station for receiving transmitted digitized representations of said speech signals;

means for decoding said received transmitted digitized representations of said speech signals to generate decoded speech signals; and means for applying said decoded speech signals to the telephone system at the receiving station.

3. A system for encoding telephone dialing signals received from a telephone system at a transmitting station, the encoded telephone dialing signals being transmitted using a digital format of a predetermined data transmission rate to a receiving station via telephone trunk lines for decoding and application to a telephone system interconnected to the telephone trunk lines at a receiving station, the telephone dialing signals having a predetermined data transmission rate other than the predetermined data transmission rate of the digital format, the system comprising:

means for receiving and storing tone signal telephone dialing signals received from the telephone system at the transmitting station for a predetermined time period;

means for converting at the transmitting station said tone signal telephone dialing signals into digital representations of said tone signal telephone dialing signals received at the transmitting station;

said means for converting at the transmitting station including circuit means interconnected to said means for receiving and storing and to the telephone trunk lines at the transmitting station for selectively clocking said means for receiving and storing at the predetermined data transmission rate of the digital format to thereby cause said means for receiving and storing to transmit digital representations of said tone signal telephone dialing signals for transmission to the receiving station;

means for converting at the receiving station the data transmission rate of the digital format of the digital representations of the tone signal telephone dialing signals received at the receiving station to the original data transmission rate of the tone signal telephone dialing signals for application to the telephone dialing system at the receiving station; and said means for converting at the receiving station including tone generator means for generating tone signal telephone dialing signals corresponding to the transmitted digitized representations of the tone signal telephone dialing signals generated by the telephone system at the transmitting station for application to the telephone system at the receiving station.

4. The system of claim 3 and further including:

circuitry interconnected to the telephone system at the transmitting station for receiving speech signals generated by the telephone system;

means for encoding said received speech signals to generate digital representations of said speech signals for transmission to the receiving station;

circuitry interconnected to the telephone system at the receiving station for receiving transmitted digitized representations of said speech signals;

means for decoding said received transmitted digitized representations of said speech signals to generate decoded speech signals; and means for applying said decoded speech signals to the telephone system at the receiving station.

* * * * *